United States Patent [19]
Tanimoto et al.

[11] Patent Number: 5,892,533
[45] Date of Patent: Apr. 6, 1999

[54] BEAM PASSAGE POSITION CONTROL APPARATUS FOR CONTROLLING A BEAM PASSAGE POSITION AND AN IMAGE FORMING APPARATUS USING THE SAME

[75] Inventors: Koji Tanimoto; Kenichi Komiya, both of Kawasaki; Naoaki Ide, Shizuoka; Jun Sakakibara, Tokyo, all of Japan

[73] Assignee: Kabushiki Kaisha Toshiba, Kawasaki, Japan

[21] Appl. No.: 821,778

[22] Filed: Mar. 20, 1997

[51] Int. Cl.[6] .................................................. B41J 2/47
[52] U.S. Cl. ......................... 347/257; 347/259; 347/260; 347/261
[58] Field of Search .................................. 347/257, 259, 347/260, 261, 242, 134, 138

[56] References Cited

U.S. PATENT DOCUMENTS 5,379,059  1/1995  Winsor ..................................... 347/257
5,543,829  8/1996  Fisli ........................................ 347/257

*Primary Examiner*—Mark J. Reinhart
*Attorney, Agent, or Firm*—Foley & Lardner

[57] ABSTRACT

A beam passing position controlling apparatus comprises a light source for emitting a beam, a mechanism for reflecting the beam toward an image carrier surface to scan the image carrier surface, a sensor for detecting a position where the beam passes on the image carrier surface, a circuit for calculating a correction amount from the position detected, a mechanism for correcting the passing position of the beam on the basis of the correction amount, and a circuit for controlling respective operations of the apparatus.

31 Claims, 14 Drawing Sheets

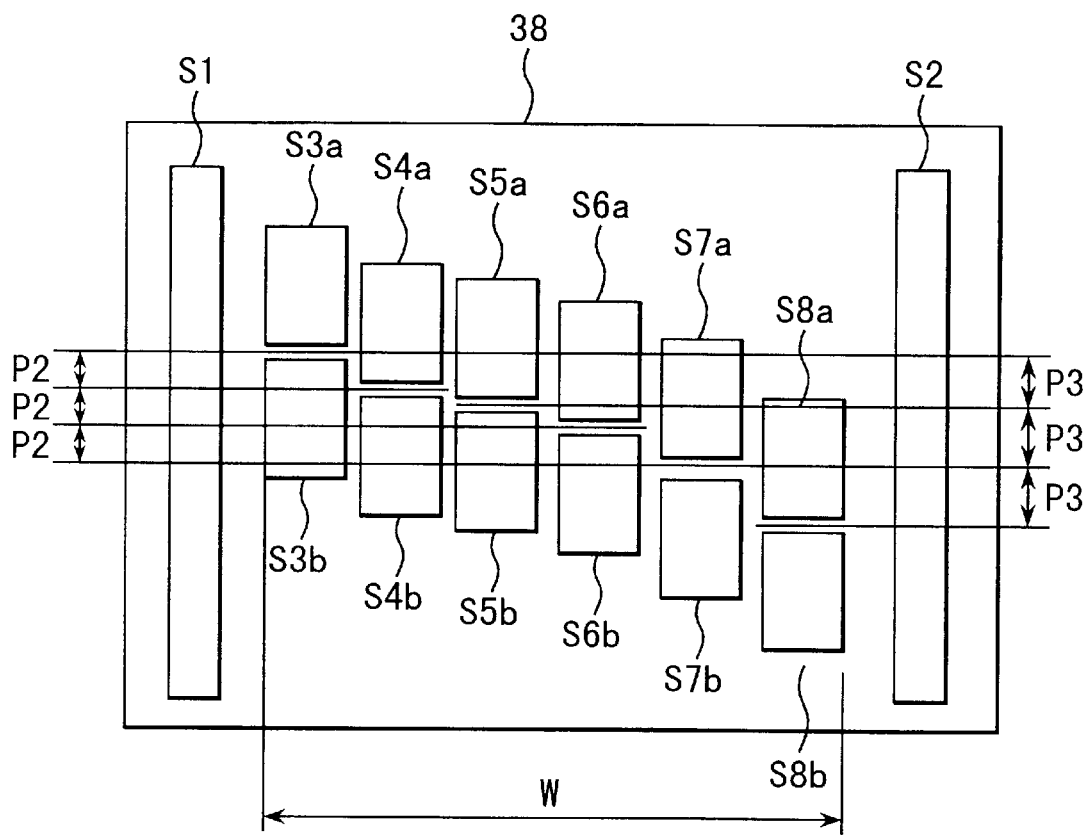
F I G. 3

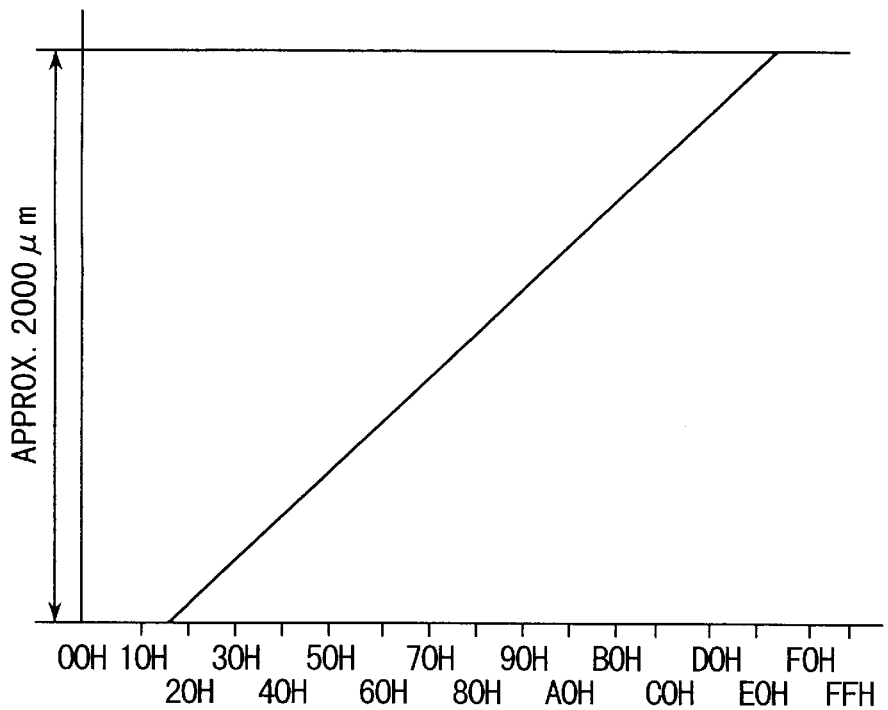
F I G. 8
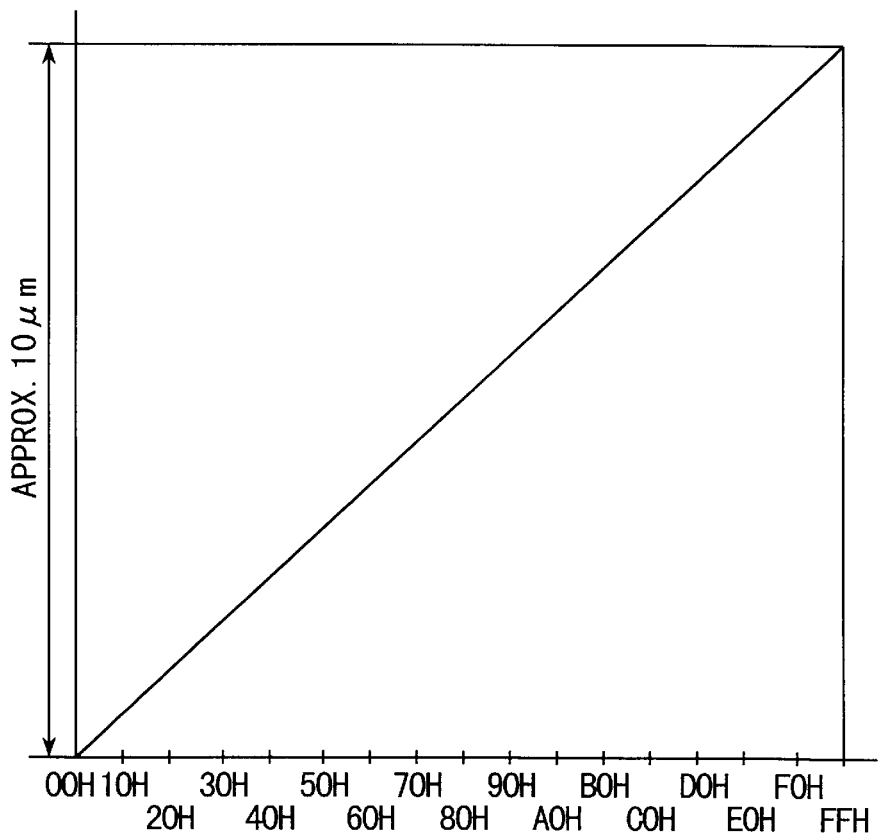
F I G. 9

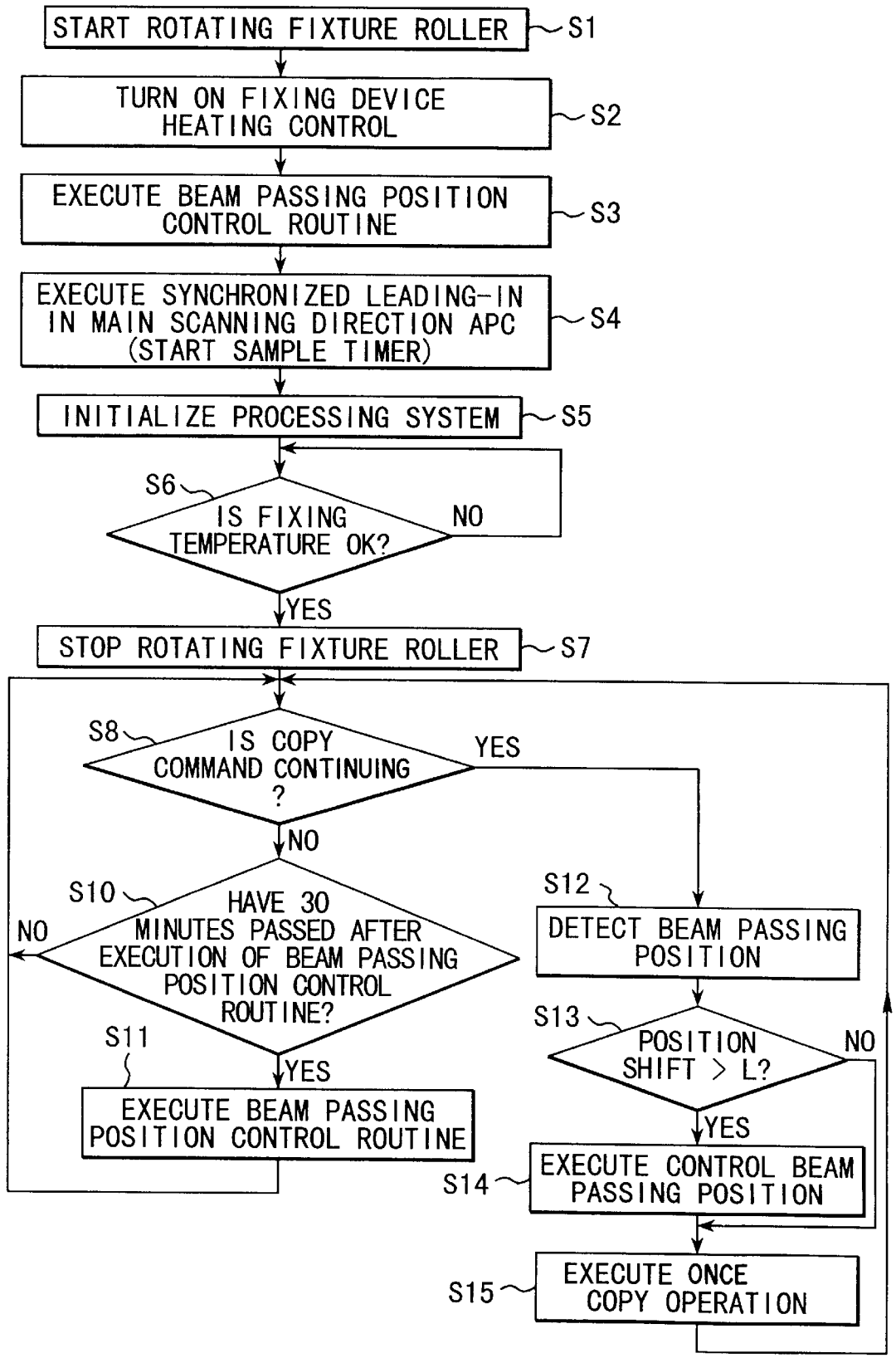
F I G. 10

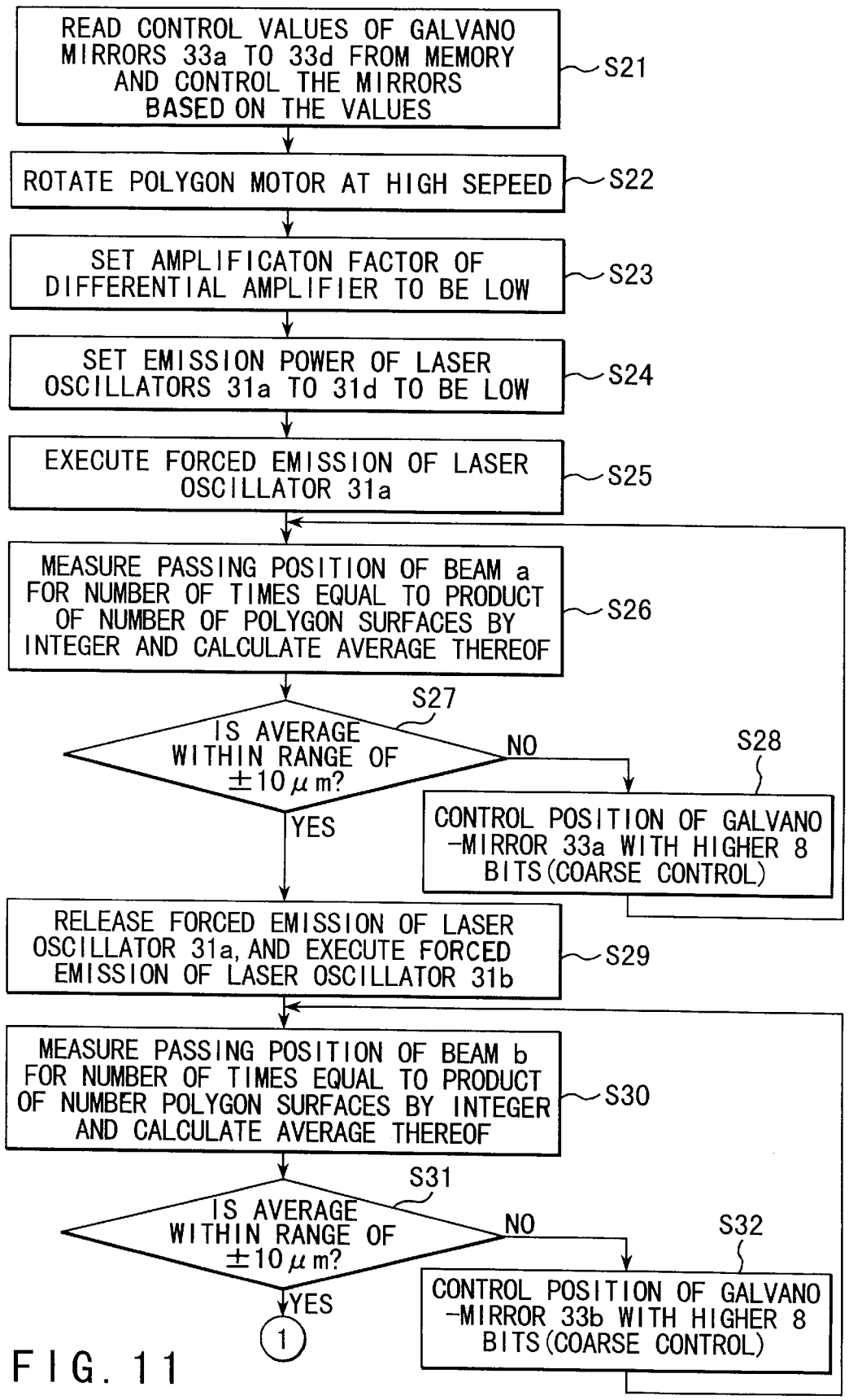
F I G. 11

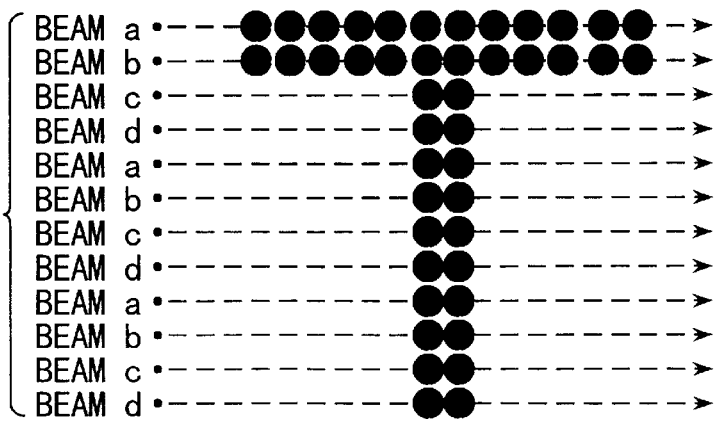
F I G. 15 A
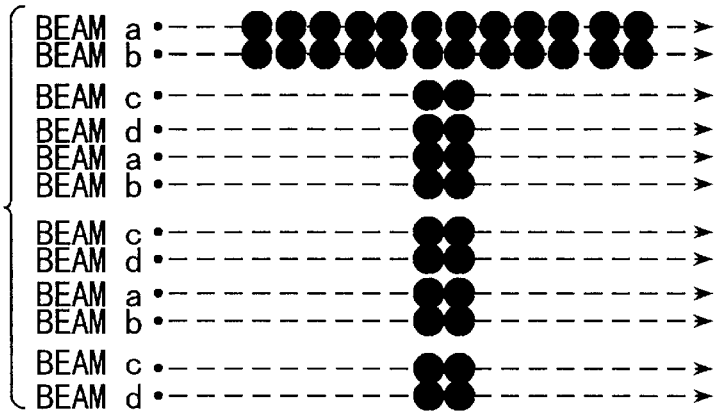
F I G. 15 B
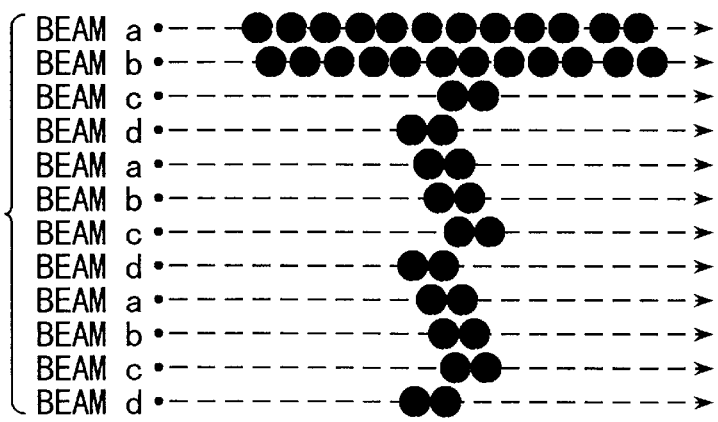
F I G. 16 A
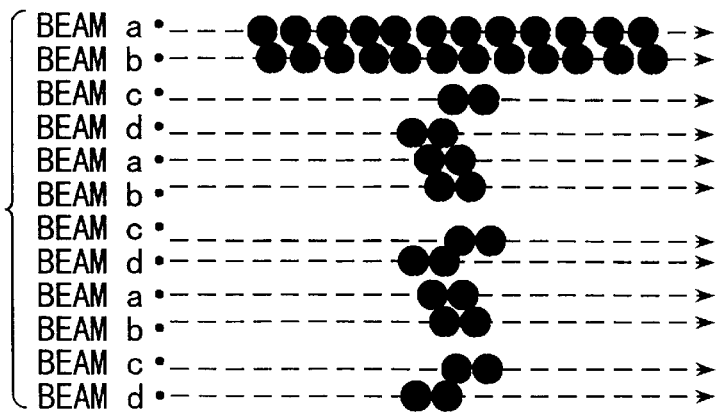
F I G. 16 B

BEAM PASSAGE POSITION CONTROL APPARATUS FOR CONTROLLING A BEAM PASSAGE POSITION AND AN IMAGE FORMING APPARATUS USING THE SAME

BACKGROUND OF THE INVENTION

The present invention relates to a beam scanning device for simultaneously scanning and exposing a single photosensitive drum with a plurality of laser beams, to form a single electro-static latent image on the photosensitive drum, and an image forming apparatus such as a digital copying machine or a laser printer using the beam scanning device.

In recent years, various digital copying machines have been developed in which image formation is performed by scanning and exposing with a laser beam and electronic photographing processing.

More recently, in order to obtain a higher image forming speed, developments have been made to a digital copying machine adopting a multi-beam method in which a plurality of laser beams are generated and scanning is simultaneously carried out for a plurality of scanning lines with use of a plurality of beams, in order to improve the image formation speed.

This kind of digital copying machine which adopts such a multi-beam method comprises a plurality of laser oscillators for generating laser beams, a polygon rotation mirror for reflecting the laser beams generated by the plurality of laser oscillators toward a photosensitive drum to scan the photosensitive drum with the laser beams, and an optical unit as a beam scanning device mainly consisting of a collimator lens and an f-θ lens.

However, in the structure of a conventional optical unit, it is very difficult to obtain an ideal positional relationship between a plurality of beams on a photosensitive drum (or a surface to be scanned). In order to obtain an ideal positional relationship, respective components as well as assembling thereof require high accuracy, and hence, the cost of the device is increased.

Even if an ideal positional relationship is obtained, the shape of a lens may be changed slightly or the positional relationship between respective components may be changed slightly due to circumferential changes, such as changes change in temperature and humidity or time-based changes. Consequently, the positional relationship between beams changes, and as a result, a high quality image cannot be formed. Therefore, to construct this kind of optical system, it is necessary to adopt a structure and components which are strong against changes as described above. Especially, as for lenses, a glass lens which is strong against circumferential changes and time-based changes is expensive so that the cost of the device is increased.

In the following, defects in an image which are caused when an image is formed with beams whose passing positions are erroneously dislocated will be explained with reference to FIGS. 15A and 15B and FIGS. 16A and 16B.

For example, in case where a character of "T" shown in FIG. 15A is formed, an image as shown in FIG. 15B is formed when a passing position of a beam is erroneously dislocated from a predetermined position. In the example of this figure, the passing position of a beam b is shifted from its predetermined position so that the distance between beams a and b is reduced while the distance between beams b and c is enlarged, among four beams a to d used.

FIG. 16A shows an example of an image in which emission timings of respective beams are not controlled correctly. As is apparent from this figure, the image forming position in the main scanning direction is dislocated so that a longitudinal line cannot be formed straight.

FIG. 16B shows an image in which neither the passing positions of beams nor the emission timings are controlled correctly, defects in an image appear both in the sub-scanning direction and in the main scanning direction.

Thus, when an image is formed in a multi-beam method, beam passing positions in the sub-scanning direction must be controlled to be arranged at predetermined intervals, and the emission timings of respective beams must be controlled so as to align the image forming position in the main scanning direction.

BRIEF SUMMARY OF THE INVENTION

The present invention has an object of providing a beam scanning device and an image forming apparatus which are capable of controlling positions of beams to predetermined positions on a scanning surface to be scanned and which are therefore capable of continuously maintaining high image quality, even if circumferential changes and time-based changes occur in their optical systems.

In addition, the present invention has another object of providing a beam scanning device and an image forming apparatus which do not require any particular accuracy or adjustment in assembling their optical systems especially when using a plurality of beams and which are capable of continuously controlling the positional relationship between respective beams on a surface to be scanned, at an ideal positional relationship, even if changes occur in their optical systems due to circumferential changes and time-based changes, so that high image quality can be continuously maintained.

According to the present invention, the beam position controlling apparatus comprises means for generating a beam; means having a plurality of reflection surfaces, for deflecting the beam emitted by the generating means onto an image carrier, so as to scan the image carrier in a first direction with the beam; means for detecting a position of the deflected beam so as to scan the image carrier, on a surface of the image carrier, and for outputting a first signal corresponding to the position of the beam; conversion means for subjecting the first signal from the detecting means to analogue/digital conversion so as to output a second signal; means for calculating an adjustment amount by which the position of the beam is corrected on the surface of the image carrier, based on the second signal outputted from the conversion means; and means for adjusting the position of the beam emitted from the generating means in a second direction perpendicular to the first direction, based on a calculation result obtained by the calculating means.

The present invention having the structure described above achieves the following operation and advantages. Specifically, the passing position of a beam can be detected with higher accuracy than a conventional apparatus, for example, by providing a measure for changing the intensity of the beam or a measure for correcting the scanning speed, to accurately control the position of a beam passing through the surface of an image carrier surface. As a result, a precise correction amount is calculated and obtained with higher accuracy on the basis of the accurate position of the beam thus detected, so that position control of a beam can be realized with higher accuracy.

Further, according to the present invention, the beam position controlling apparatus comprises means for generating a beam; means having a plurality of reflection surfaces, for deflecting the beam emitted by the generating means onto an image carrier, so as to scan the image carrier in a first direction with the beam; means for detecting a position of the deflected beam so as to scan the image carrier, on a surface of the image carrier, and for outputting a first signal corresponding to the position of the beam; conversion means for subjecting the first signal from the detecting means to analogue/digital conversion so as to output a second signal; means for calculating an adjustment amount by which the position of the beam is corrected on the surface of the image carrier, based on the second signal outputted from the conversion means; means for adjusting a position of the beam emitted from the generating means in a second direction perpendicular to the first direction, based on a calculation result obtained by the calculating means; and means for controlling an emission intensity of the deflecting means when the detecting means detects the passing position of the beam, such that the emission intensity of the deflecting means is greater that than when an image is formed by an image formation means.

The present invention having the structure described above achieves the following operation and advantages. Specifically, the position of a beam can be detected with higher accuracy by making a more intensive beam be emitted than that emitted when forming an image is formed. On the basis of the position of the beam detected with this higher accuracy, an optimum correction amount for the beam is calculated, so that optimum control of the position of a beam can be performed with higher accuracy.

Further, according to the present invention, the beam position controlling apparatus comprises means for generating a beam; means having a plurality of reflection surfaces, for deflecting the beam emitted by the generating means onto an image carrier, so as to scan the image carrier in a first direction with the beam; means for detecting a position of the deflected beam so as to scan the image carrier, on a surface of the image carrier, and for outputting a first signal corresponding to the position of the beam; conversion means for subjecting the first signal from the detecting means to analogue/digital conversion so as to output a second signal; means for calculating an adjustment amount by which the position of the beam is corrected on the surface of the image carrier, based on the second signal outputted from the conversion means; means for adjusting a position of the beam emitted from the generating means in a second direction perpendicular to the first direction, based on a calculation result obtained by the calculating means; and means for controlling a scanning speed of the scanning means when the detecting means detects the passing position of the beam, such that the scanning speed of the scanning means is greater than that when an image is formed by an image formation means.

The present invention having the structure describe above achieves the following operation and advantages. Specifically, the passing period of a beam passing through light receiving patterns is elongated by performing scanning operation with a lower scanning speed than that adopted when an image is formed, so that the passing position of the beam can be detected with higher accuracy. Therefore, on the basis of the position of the beam detected with this higher accuracy, optimum position control of a beam can be realized with higher accuracy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view schematically showing the structure of a beam detector;

FIG. 8 is a graph showing an operational resolution ability of a galvano mirror;

FIG. 9 is a graph showing an operational resolution ability of a galvano mirror;

FIG. 10 is a flow-chart explaining schematic operation when the power of a printer section is turned on;

FIG. 11 is a flow-chart explaining a beam passing position control routine;

FIGS. 15A and 15B are views explaining image defects which may occur when an image is formed with a beam whose position is shifted; and FIGS. 16A and 16B are views explaining image defects which may occur when a image is formed with a beam whose position is shifted.

DETAILED DESCRIPTION OF THE INVENTION

In the following, an embodiment of the present invention will be explained with reference to the drawings.

Figure 1:
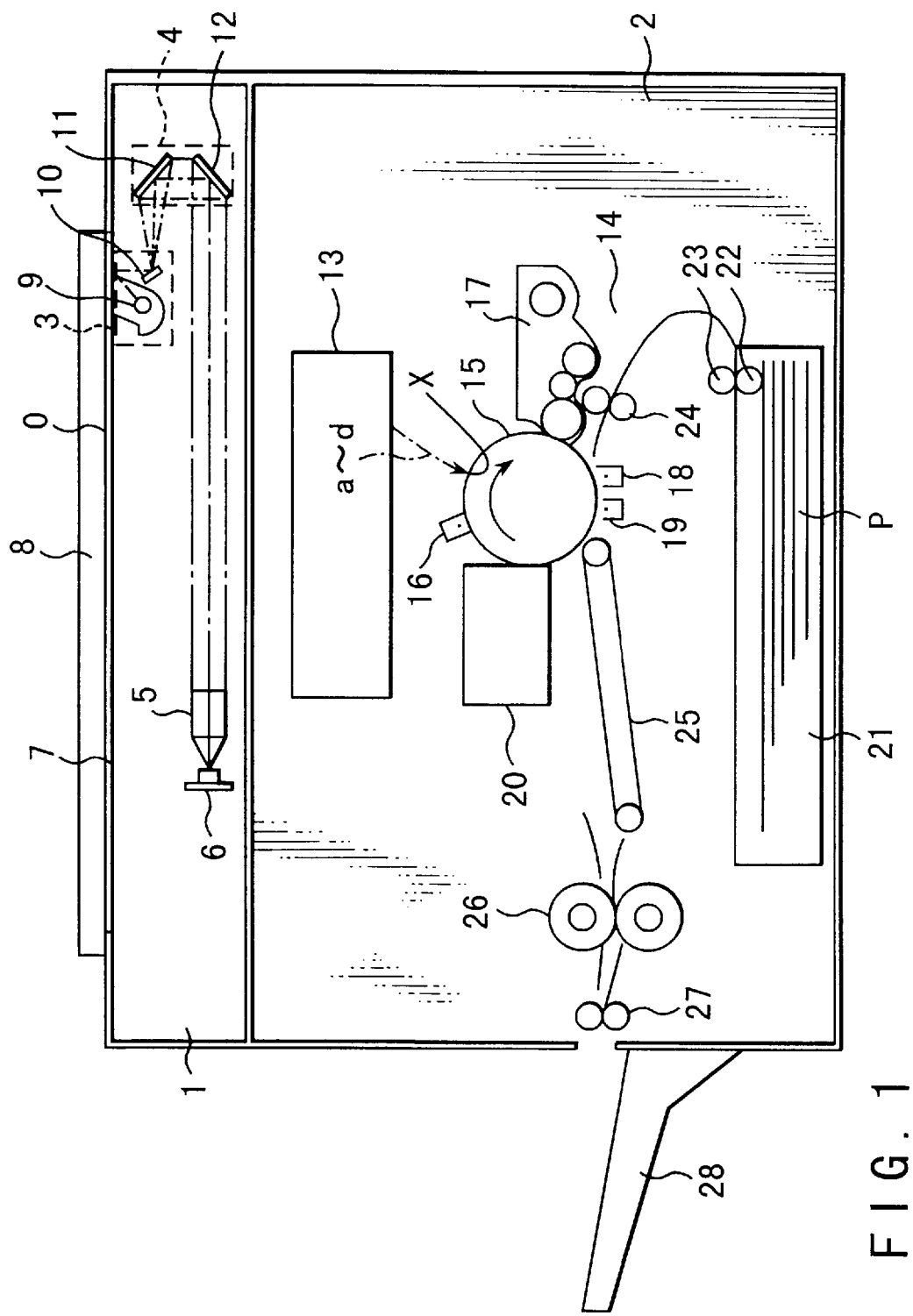
FIG. 1 is a view schematically showing the structure of a digital copying machine according to an embodiment of the present invention.

FIG. 1 shows the structure of a digital copying machine as an image forming apparatus which adopts a beam scanning device according to an embodiment of the present invention. Specifically, this digital copying machine comprises a scanner section 1 and a printer section 2. The scanner section 1 comprises a first carriage 3 and a second carriage 4 which are movable in the arrow direction in the figure, an imaging lens 5, and a photoelectric transfer element 6.

In FIG. 1, an original O is placed on an original mount 7 made of transparent glass such that the original faces downwards. The original O aligned with a mount index which is the center of the shorter edge of the original mount 7 in the right-hand side in the figure is pressed against the original mount 7 by an original fixing cover 8.

The original O is illuminated by a light source 9 and the reflection light therefrom is converged onto a light receiving surface of the photoelectric conversion element 6, by mirrors 10, 11, and 12 and an imaging lens 5. Here, the first carriage 3 equipped with the light source 9 and the mirror 10 and the second carriage 4 mounting the mirrors 11 and 12 are moved with a relative speed of 2:1 such that the length of the light path is maintained to be constant. The first and second carriages 3 and 4 are moved by a carriage drive motor (not shown) from the right-hand side to the left-hand side in synchronization with a read timing signal.

As described above, an image of the original O placed on the original mount 7 is sequentially read in units of lines by a scanner section 1. An output obtained by thus reading the image is converted into digital image signals representing gradation of the image by an image processing section not shown.

The printer section 2 comprises an optical unit 13 and an image forming section 14 adopting an electronic photographing method in which an image can be formed on a paper sheet P as a medium on which an image is formed. Specifically, image signals read out from the original O by the scanner section 1 are processed by an image processing section not shown, and thereafter, are converted into laser beams (which will be referred to as only beams hereinafter) from semiconductor laser oscillators. The present embodiment adopts a multi-beam optical system using a plurality of (two or more) semiconductor laser oscillators.

Although the structure of the optical unit 13 will be specifically described later, a plurality of semiconductor laser oscillators provided in the unit carry out emission operation in accordance with laser modulation signals outputted from an image processing section not shown. The beams outputted from the oscillators are reflected by a polygon mirror to form scanning beams which are outputted to the outside of the unit.

A plurality of beams outputted from the optical unit 13 are imaged as spotted scanning beams having a resolution necessary for an exposure position X on a photosensitive drum 15 as an image support member, and thus, scanning and exposing are performed. As a result of this, an electrostatic latent image is formed on the photosensitive drum 15, in accordance with image signals.

In the periphery of the photosensitive drum 15, there are provided an electric charger 16 for electrically charging the surface of the the drum, a developer device 17, a transfer charger 18, a separation charger, a cleaner 20, and the likes. The photosensitive drum 15 is driven to rotate at a predetermined circumferential speed by a drive motor (not shown), and is electrically charged by the electric charger 16 provided so as to face the surface of the drum. A plurality of beams (or scanning beams) are spotted on an exposure position X on the charged photosensitive drum 15, thereby forming an image.

An electro-static latent image formed on the photosensitive drum 15 is developed with toner (or developer) supplied from the developer device 17. The photosensitive drum 15 on which a toner image is formed by developing is transferred at a transfer position onto a paper sheet P supplied at a certain timing from a sheet supply system, by the transfer charger 18.

The sheet supply system sequentially supplies paper sheets P in a sheet supply cassette provided at a bottom portion, separated from each other by a sheet supply roller 22 and a separation roller 23. Every paper sheet P is fed to a resist roller 24, and is fed to a transfer position at a predetermined timing. In the downstream side of the transfer charger 18, there are provided a sheet conveyer mechanism 25, a fixing device 26, and delivery rollers 27. Therefore, a paper sheet P on which a toner image has been transferred is fed out onto an external sheet supply tray 28 through the delivery rollers 27, after the toner image is fixed by the fixing device 26.

In addition, a cleaner 20 removes toner remaining on the surface of the photosensitive drum 15 from which a toner image has been transferred onto a paper sheet P, and the drum thereby recovers an initial condition in a stand-by condition.

Image forming operation is continuously performed by repeating the processing operation as described above.

As has been explained above, data is read out from an original O placed on an original mount 7 by a scanner section 1, and the data thus read is subjected to a series of processing at a printer section 2. Thereafter, the data is recorded as a toner image on a paper sheet P.

Next, the optical unit 13 will be explained below.

Figure 2:
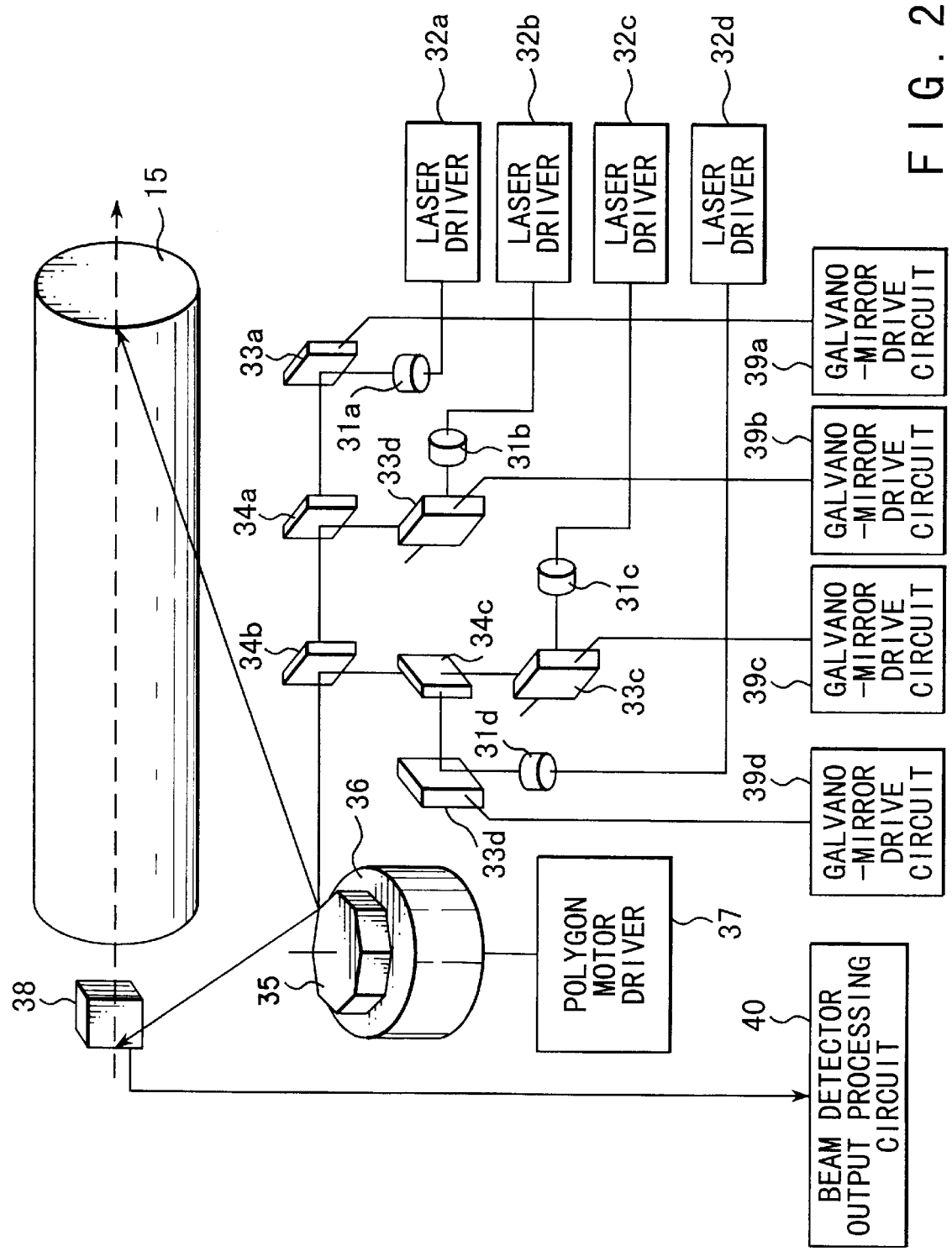
FIG. 2 is a view showing the structure of an optical unit and the positional relationship of a photosensitive drum.

FIG. 2 shows the structure of the optical unit 13 and the positional relationship of the unit 13 with the photosensitive drum 15. The optical unit 13 includes, for example, four semiconductor laser oscillators $31a$, $31b$, $31c$, and $31d$, and each of these oscillators performs image formation for one scanning line at the same time, so that high speed image formation is realized without extremely increasing the rotation speed of the polygon mirror.

Specifically, the laser oscillator $31a$ is driven by a laser driver $32a$. A beam outputted therefrom passes through a collimator lens not shown and thereafter enters into a galvano mirror $33a$. The beam reflected by the galvano mirror 33a passes through an half-mirrors $34a$ and $34b$ and enters into a polygon mirror 35 as a rotational polygonal mirror.

The polygon mirror 35 is rotated at a constant speed by a polygon motor 36 driven by a polygon motor driver 37. In this manner, the beam reflected by the polygon mirror 35 swings such that scanning is performed in a constant direction at an angle speed depending on the rotation speed of the polygon motor 36. The scanning beam swung by the polygon mirror 35 passes through an f-θ lens, thereby scanning the light receiving surface of a beam detector 38 as a beam passing position detector means and the photosensitive drum 15, owing to the f-θ characteristic of the θ.

The laser oscillator $31b$ is driven by a laser driver $32b$. A beam outputted therefrom passes through a collimator lens not shown and is thereafter reflected by a galvano mirror $33b$ and further by an half-mirror $34a$. The beam reflected by the half-mirror $34a$ passes through an half-mirror $34b$ and enters into the polygon mirror 35. The route of the beam after the polygon mirror 35 is the same as that of laser oscillator $31a$, i.e., the beam passes through an f-θ lens not shown, thereby scanning the light receiving surface of the beam detector 38 and the photosensitive drum 18.

The laser oscillator $31c$ is driven by a laser driver $32c$. A beam outputted therefrom passes through a collimator lens and is thereafter reflected by a galvano mirror $33c$. The beams further passes through an half-mirror $34c$, is reflected by an half-mirror $34b$, and then enters into the polygon mirror 35. The route of the beam after the polygon mirror 35 is the same as those of the laser oscillators 31a and 31b, i.e., the beam passes through an f-θ lens, thereby scanning the light receiving surface of the beam detector 38 and the photosensitive drum 15.

The laser oscillator 31d is driven by a laser driver 32d. A beam outputted therefrom passes through a collimator lens not shown and is thereafter reflected by a galvano mirror 33d. The beam is further reflected by half-mirrors 34c and 34b, and enters into the polygon mirror 35. The route of the beam after the polygon mirror 35 is the same as those of the laser oscillators 31a, 31b, and 31c, i.e., the beam passes through an f-θ lens not shown, thereby scanning the light receiving surface of the beam detector 38 and the photosensitive drum 15.

Thus, beams outputted from individual laser oscillators 31a, 31b, 31c, and 31d are synthesized by half-mirrors 34a, 34b, and 34c so that four beams extends in the direction toward the polygon mirror 35.

Therefore, the photosensitive drum 15 can be simultaneously scanned with four beams, so that an image can be recorded at a four times higher speed than in a conventional single beam on condition that the polygon mirror 35 is rotated at an equal rotation speed.

The galvano mirrors 33a, 33b, 33c, and 33d are used to adjust (or control) the positional relationship between beams in the sub-scanning direction, and are respectively connected to galvano mirror drive circuits 39a, 39b, 39c, and 39d.

The beam detector 38 serves to detect passing positions and passing timings of four beams, and is provided near an end portion of the photosensitive drum 15 such that the light receiving surface of the detector 38 is situated at a level equal to the surface of the photosensitive drum 15. On the basis of a detection signal from the beam detector 38, control of the galvano mirrors 33a, 33b, 33c, and 33d (i.e., control of image forming positions in the sub-scanning direction), control of emission power (i.e., intensity) of the laser oscillators 31a, 31b, 31c, and 31d, as well as control of emission timings (i.e., control of image forming positions in the main scanning direction) are respectively performed in correspondence with the beams although the details of the control will be described later. The beam detector 38 is connected to a beam detector processing circuit 40, in order to generate signals for performing the control as described above.

In the next, the beam detector 38 will be explained below.

FIG. 3 schematically shows the structure of the beam detector 38. As shown in the figure, the beam detector 38 comprises light receiving patterns S1 and S2 and light receiving patterns S3a to S8b. Specifically, the light receiving patterns S1 and S2 are formed in rod-like shapes, and disposed in parallel with a predetermined distance inserted between each other in the direction perpendicular to the main scanning direction. The light receiving pattern S1 is used to detect passing timings of four beams, and outputs an electric signal when a beam passes. The light receiving pattern S2 is used to obtain a timing for circuit operation, and outputs an electric signal when a beam passes.

The light receiving patterns S3a to S8b are used to passing positions of four beams. Patterns S3a and S3b are disposed longitudinally (in the sub-scanning direction) thereby forming a pair. Patterns S4a and S4b, patterns S5a and S5b, patterns S6a and S6b, patterns S7a and S7b, as well as patterns S8a and S8b are disposed and paired in a manner similar to the patterns S3a and S3b. These six pairs are disposed between the light receiving patterns S1 and S2, as is shown in the figure.

The present embodiment is arranged such that recording can be performed at both resolutions of 400 DPI and 600 DPI (i.e., 63.5 μm and 42.3 μm). Of these resolutions, the light receiving patterns corresponding to the resolution of 600 DPI are pairs of S3a and S3b, S4a and S4b, S6a and S6b, and S7a and S7b, and these pairs are shifted from each other by a distance of P2 (42.3 μm).

Further, with use of these pairs of light receiving patterns, a passing position of a beam a from the laser oscillator 31a can be detected by comparing outputs of light receiving patterns S3a and S3b with each other; a passing position of a beam b from the laser oscillator 31b can be detected by comparing outputs of patterns S4a and S4b with each other; a passing position of a beam c from the laser oscillator 31c can be detected by comparing outputs of patterns S6a and S6b with each other; and a passing position of a beam d from the laser oscillator 31d can be detected by comparing outputs of patterns S7a and S7b.

If outputs of patterns forming each pair are well-balanced, it is understood that each beam passes through the center between a pair of patterns and that the distance between any adjacent beams is maintained at a predetermined distance (i.e., 42.3 μm in this case).

Light receiving patterns corresponding to the resolution of 400 DPI are pairs of patterns S3a and S3b, patterns S5a and S5b, patterns S7a and S7b, and patterns of S8a and S8b, and these pairs are shifted from each other in the sub-scanning direction by an interval of P3 (63.5 μm). Note that detection of passing positions and identification of distances between beams in this case are based on the same principal and manner as in the above case of 600 DPI.

Light receiving patterns S3a, S3b, S7a and S7b are common to both resolutions of 400 DPI and 600 DPI. Thus, since a part of light receiving patterns is commonly used for both resolutions, increases in number of light receiving patterns can be minimized.

Next will be explained the range of the beam scanning direction with respect to the widths of the light receiving patterns S3a to S8b. If the patterns has a large width, the distance W shown in FIG. 3 is large too. If the distance W is large, substantial values of P2 and P3 are greatly changed even when the beam detector 38 is slightly inclined. In this condition, control targets are dislocated even if control operation is regularly carried out. As a result, proper control cannot be achieved. In order to achieve proper control, it is required to install the beam detector 38 with high accuracy in relation to the scanning direction of beams.

To obtain any relaxation of the requirement for the accuracy, the width of the light receiving patterns S3a to S8b in the beam scanning direction should desirably be as small as possible. However, if the width of the patterns S3a to S8b in the beam scanning direction is reduced, the signal output period of signals from the light receiving patterns is shortened so that signals cannot attain an excellent S/N ratio.

Responsive to this problem, the present embodiment adopts the following measures which will be specifically described later. E.g., the emission power of the laser oscillators is raised to enhance the outputs from the light receiving patterns themselves, or the rotation speed of the polygon motor 36 (or polygon mirror 35) is reduced to elongate the passing periods of beams on the light receiving patterns.

In the next, the control system will be explained.

Figure 4:
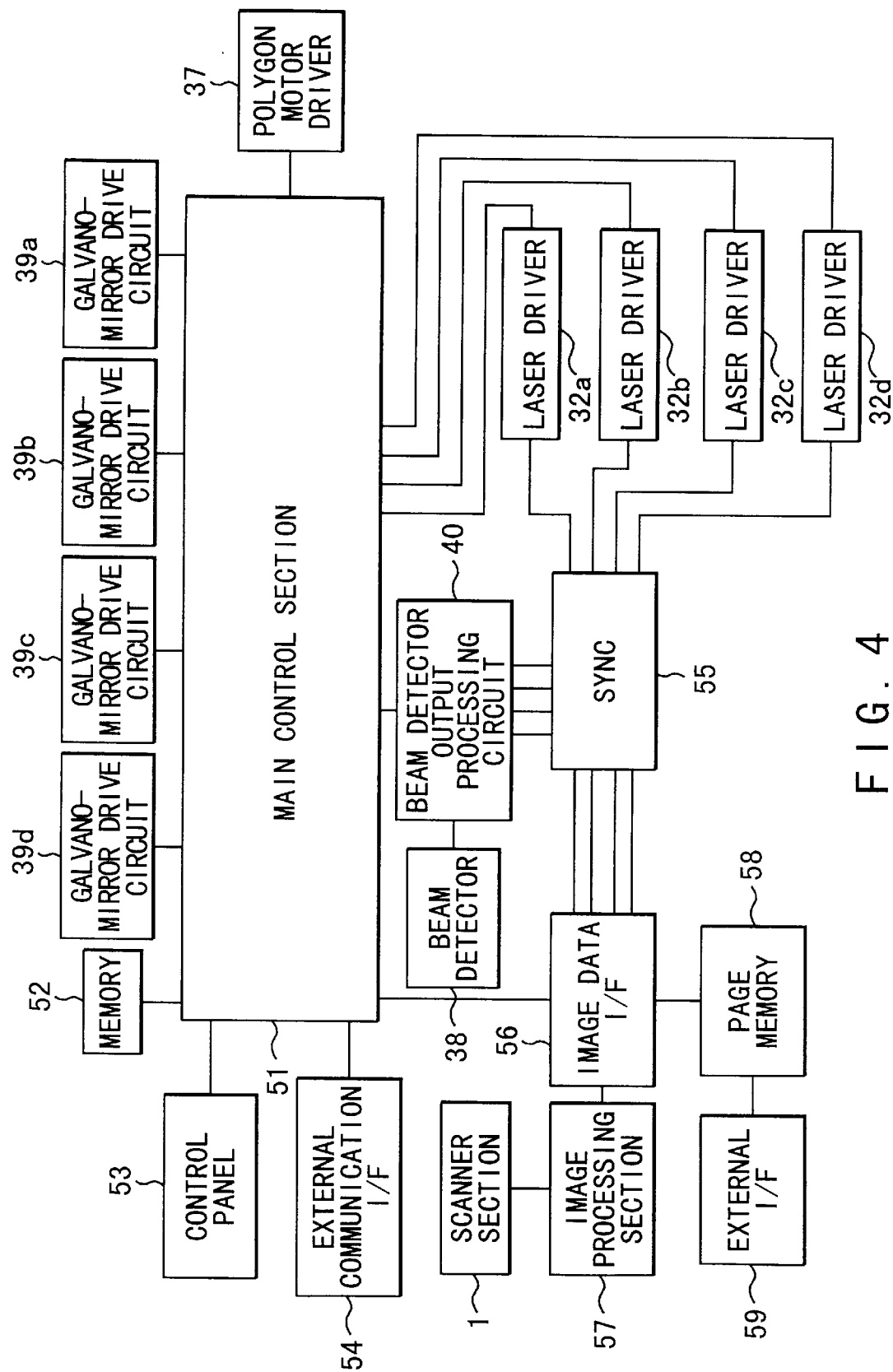
FIG. 4 is a block diagram showing a control system constructed for mainly controlling the optical system.

FIG. 4 shows a control system which mainly serves to control a multi-beam optical system. Specifically, a main control section 51 for performing total control includes, for example, a CPU which is connected with a memory 52, a control panel 53, an external communication interface (I/F) 54, laser drivers 32a, 32b, 32c, and 32d, a polygon mirror motor driver 37, a galvano mirror drive circuit 39a, 39b, 39c, and 39d, a beam detector output processing circuit 40, a synchronization circuit 55, and an image data interface (I/F) 56.

The synchronization circuit 55 is connected with the image data I/F 56 which is connected with an image processing section 57 and a page memory 58. The image processing section 57 is connected with a scanner section 1, and the page memory 58 is connected with an external interface (I/F) 59.

Here, brief explanation will be made to the flow of image data when an image is formed.

At first, in case of copying operation, an image of an original O set on the original mount 7 is read out by the scanner section 1 and sent to the image processing section 57. The image processing section 57 performs conventional shading correction, various filtering processing, gradation processing, and gamma correction, on image signals from the scanner 1, and thereafter, the signals are digitized.

The image data from the image processing 57 is sent to the image data I/F 56. The image data I/F 56 serves to distribute the image data to four laser drivers 32a, 32b, 32c, and 32d. The synchronization circuit 55 generates clocks synchronized with the timings at which beams pass through the beam detector 38. In synchronization with these clocks, image data is sent in form of laser modulation signals, from the image data I/F 56 to the laser drivers 32a, 32b, 32c, and 32d from the I/F 56. In this manner, image data is transmitted in synchronization with scanning by beams, and as a result, it is possible to achieve image formation attaining synchronization (or correct positions) in the main scanning direction.

A plurality of kinds of clocks are prepared in the synchronization circuit 55, so as to comply with the resolutions of images to be recorded. Among these kinds of clocks, one kind which has a predetermined cycle is selected in accordance with an instruction from the control panel 53 described later or an instruction inputted from outside through the external I/F 59.

The synchronization circuit 55 further includes a sample timer for forcedly making laser oscillators 31a, 31b, 31c, and 31d emit beams in a non-image region, to control the power of respective beams, and a logic circuit for making the laser oscillators 31a, 31b, 31c, and 31d emit beams onto the beam detector 38, respectively, to obtain image forming timings of the beams in the order of the beams.

The control panel 53 is a man-machine interface for starting copying operation or for setting a number of sheets and the likes.

The present digital copying machine does not only perform copying operation, but also forms and outputs image data inputted from outside through the external I/F 59 connected to the page memory 58. In this case, the resolution of images must be set in compliance with the external I/F 59. Then, the resolution can be instructed by the control panel 53. Note that image data inputted from the external I/F 59 is once stored into the page memory 58 and thereafter sent to the synchronization circuit 55.

When the present copying machine is externally controlled through a network or the like, the external communication I/F operates in place of the control panel 53.

Galvano mirror drive circuits 39a, 39b, 39c, and 39d respectively serve to drive galvano mirrors 33a, 33b, 33c, and 33d, in accordance with an instruction value from the main control section 51. Therefore, the main control section is capable of freely controlling the angles of the galvano mirrors 33a, 33b, 33c, and 33d, through the galvano mirror drive circuits 39a, 39b, 39c, and 39d.

The polygon motor driver 37 is a driver for driving a motor 36 which rotates the polygon mirror, to perform scanning with four beams described before. The main control section 51 is capable of making the polygon motor driver 37 start and stop rotation and switch the rotation speed. Switching of the rotation speed is carried out to reduce the rotation speed to be lower than a predetermined rotation speed when a passing position of a beam is checked, or is carried out to switch the resolution.

Laser drivers 32a, 32b, 32c, and 32d does not function to emit laser beams in accordance with laser modulation signals from the synchronization circuit 55, synchronized with scanning with beams, but also functions to forcedly make the laser oscillators 31a, 31b, 31c, and 31d emit beams regardless of image data.

In addition, the main control section 51 sets the power with which the laser oscillators 31a, 31b, 31c, and 31d emit beams, into the laser drives 32a, 32b, 32c, and 32d. Setting of the emission power is corrected in accordance with a difference in resolution between images to be recorded and with detection of passing positions of beams.

The memory 52 serves to store information necessary for control. For example, the optical unit 13 can be rendered capable of immediately forming an image after the power source is turned on, by storing control amounts for galvano mirrors 33a, 33b, 33c, and 33d and the order of arrivals of beams.

In the next, passing (or scanning) position control for beams will be specifically explained below.

Figure 5:
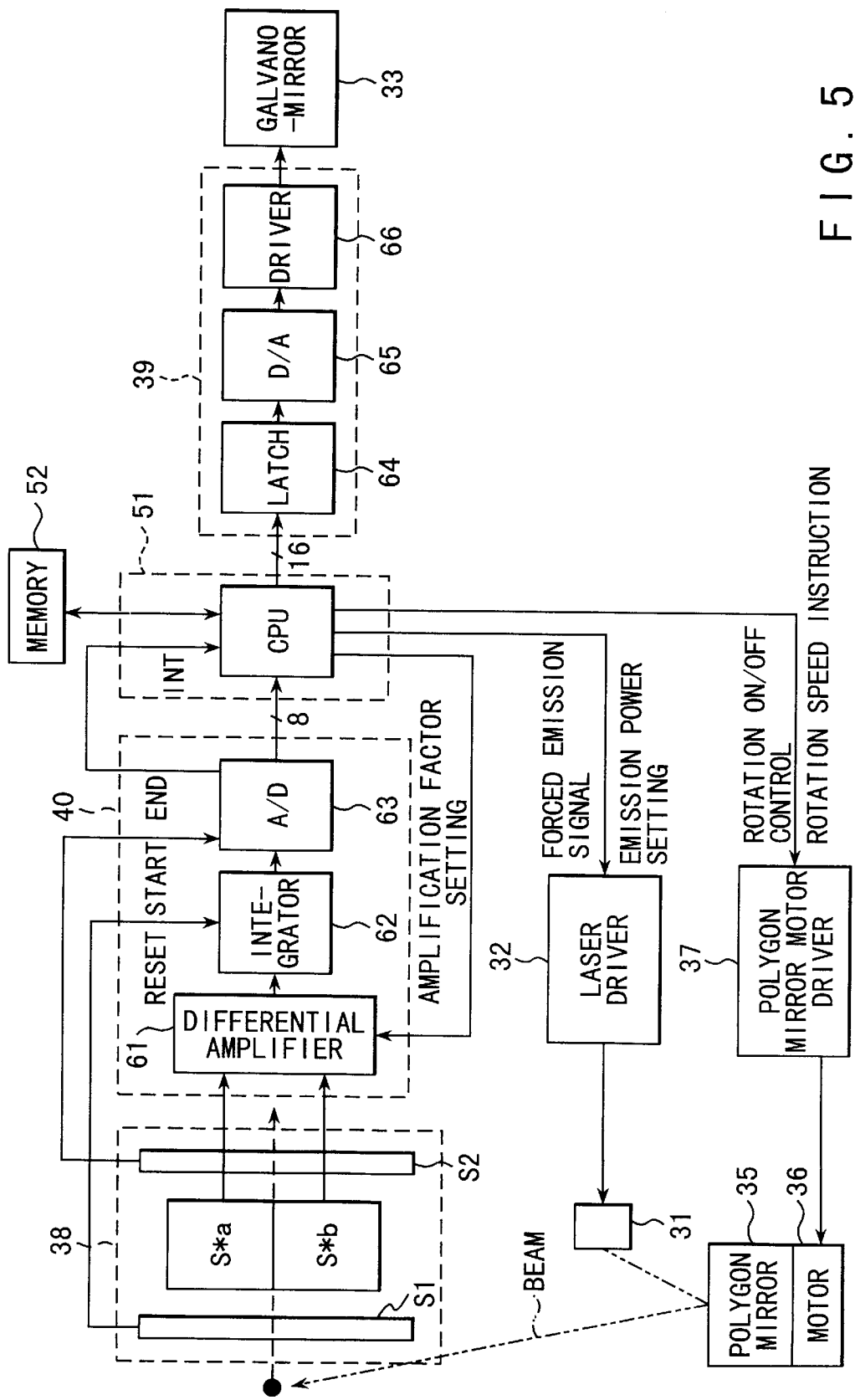
FIG. 5 is a block diagram explaining passing positions of beams.

FIG. 5 is a diagram for explaining passing (or scanning) position control for beams. In this figure, taking into consideration one stage of the block diagram in FIG. 4, and portions associated with the control in the stage are indicated.

As has been explained above, passing positions of the beams are obtained by comparing outputs from paired light receiving patterns in a beam detector 38. In this figure, paired light receiving patterns for detecting passing positions of beams are denoted as S*a and S*b. Outputs from these two light receiving patterns S*a and S*b are inputted into a differential amplifier 61 provided in the beam detector output processing circuit 40, and the difference between the two outputs is amplified. An output from the differential amplifier 61 is integrated by an integrator 62 and is sent to an A/D converter 63. The A/D converter 63 converts an output signal from the integrator 62 into a digital signal of 00H to FFH, for example.

Specifically, when a beam subjected to scanning by a rotating polygon mirror 35 enters into a light receiving pattern S1 of the beam detector 38, the light receiving pattern S1 outputs a reset signal (RESET) to the integrator 62. The integrator 62 clears preceding integration information in response to the reset signal and newly starts integration operation.

The integrator 62 is inputted with an output from the differential amplifier 61, and the integrator 62 integrates the output of the differential amplifier 61 inputted when a beam passes through the light receiving patterns S*a and S*b. Here, the integrator 62 functions to take in and integrate all the outputs of the light receiving patterns obtained while a beam is passing through the beam detector 38, thereby to obtain a stable output having an excellent S/N.

Figures 6A, 6B, 6C:
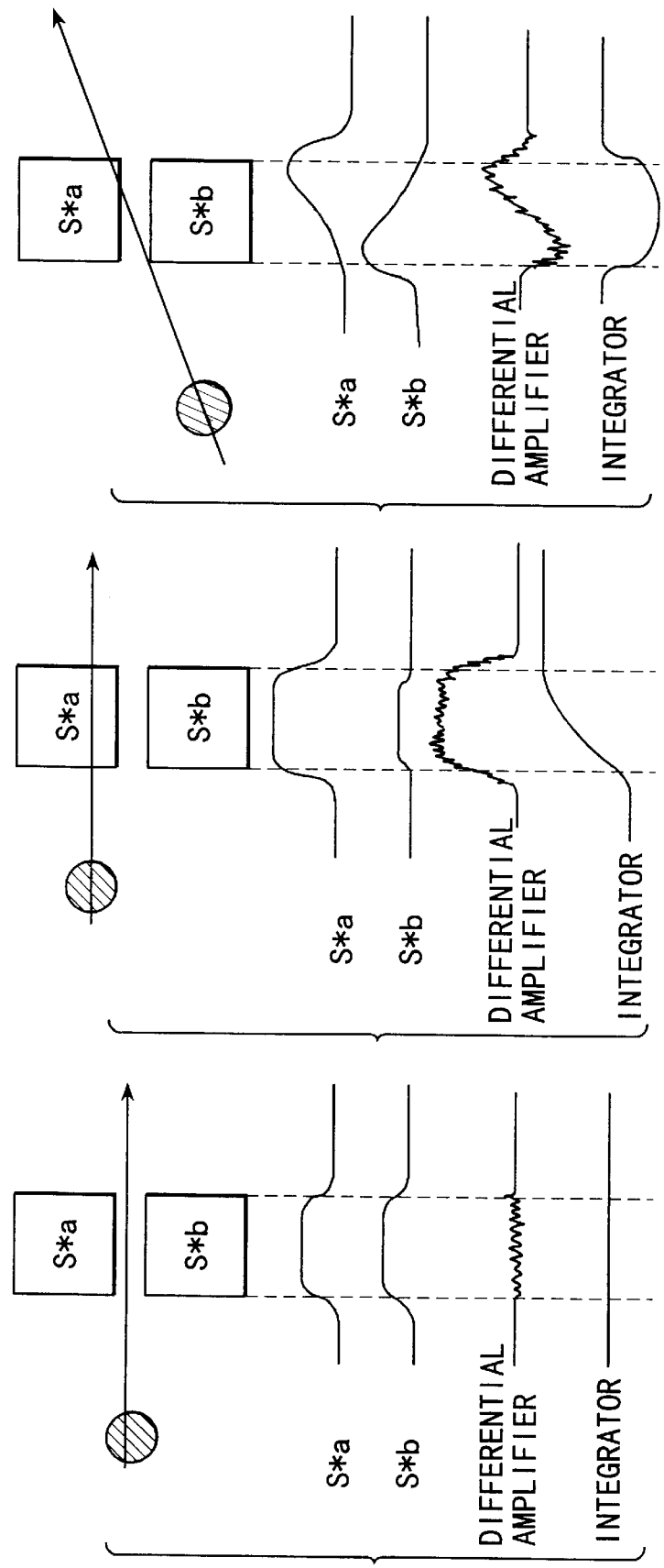
FIGS. 6A, 6B and 6C are respectively views showing relationships between a passing position of a beam and a beam receiving pattern output of a beam detector, an output of a differential amplifier, and an output of an integrator.

In the following, operation of the integrator 62 will be explained with reference to FIGS. 6A, 6B, and 6C. FIGS. 6A to 6C show relationships between a passing position of a beam, outputs from light receiving patterns S*a and S*b of the beam detector 38, and an output of a differential amplifier 61, and an integrator 62.

FIG. 6A shows an example where a beam passes through the center of light receiving patterns S*a and S*b. In this case, it is ideal that output waveforms of light receiving patterns S*a and S*b are absolutely equal to each other and the output of the differential amplifier 61 is continuously maintained at "0". The outputs of the light receiving patterns S*a and S*b actually include more or less noise, and therefore, the output of the differential amplifier 61 is not "0" but is an output including noise.

If there is no integrator 62, a value of the output including the noise at an instance is subjected to A/D conversion and is used as passing position information of a beam, so that proper control cannot be achieved. However, by integrating the output of the differential amplifier 61 by means of an integrator 62, it is possible to obtain a signal from which noise components are removed.

FIG. 6B shows an example where the passing position of a beam is deviated to the side of the light receiving pattern S*a. In comparison with the example of FIG. 6A, the output of the light receiving pattern S*a is large while the output of the light receiving pattern S*b is small. Therefore, the differential amplifier 61 outputs a positive voltage representing that the passing position of a beam is deviated to the side of the light receiving pattern S*a.

However, like in the case of FIG. 6A, a noise component is superposed on the the output, and therefore, it is difficult to obtain an accurate position. In this case, also, an excellent signal including no noise can be obtained by performing integration by means of an integrator 62.

FIG. 6C shows an example where the light receiving patterns S*a and S*b are inclined with respect to the scanning direction of a beam. Although a sharp inclination is illustrated in this figure for easy understanding of the operation, there is a case that the inclination may be so slight that the inclination cannot be observed with eyes. In the case of this figure, a beam enters obliquely to the light receiving patterns S*a and S*b due to scanning by the polygon mirror 35.

Therefore, as shown in the figure, the output of the light receiving pattern S*a gradually increases as a beam passes. On the contrary, the output of the light receiving pattern S*b gradually decreases as a beam passes.

If the difference between these signals are amplified, a signal having minus and plus amplitudes is obtained as shown in the figure. Actually, a noise component is superposed on the signal obtained. Proper control cannot be achieved if such a signal is picked up at an instance and is subjected to A/D conversion and if the conversion result is used as passing position information of a beam.

In this case, also, an average passing position of beams is obtained by integrating the output of the differential amplifier 61 by means of the integrator 62. In the case of this figure, a beam averagely passes through the substantial center of the light receiving patterns S*a and S*b, so that the output of the integrator 62 is substantially "0".

The A/D converter 63 is inputted with an output of the light receiving pattern S2. As for a signal outputted from the integrator 62, A/D conversion is started at a timing at which a beam passes through the light receiving pattern S2. When the A/D conversion ends, an end signal (END) is supplied to the main control section (CPU) 51 from the A/D converter 63. The main control section 51 treats the end signal as an interruption signal, and recognizes that new beam passing position information is inputted, and performs corresponding processing.

On the basis of the beam passing position information thus obtained, the main control section 51 calculates the control amount for the galvano mirror 33. The calculation result is stored into the memory 52 if necessary. The main control section 51 sends the calculation result to the galvano mirror drive circuit 39.

The galvano mirror drive circuit 39 is provided with a latch 64 for latching the data, as shown in FIG. 5. Once the main control section 51 writes data, this section 51 maintains the value until the data is next updated. The data latched in the latch 64 is converted into an analogue signal (or voltage) by the D/A converter 65, and is inputted into the driver circuit 66 for driving the galvano mirror 33. The driver circuit 66 drives and controls the galvano mirror 33 in accordance with the analogue signal (voltage) inputted from the D/A converter 65.

In this manner, the passing position of a beam is detected by the beam detector 38. On the basis of the information of the passing position, the main control section 51 calculates the control amount for the galvano mirror 33. On the basis of the calculation result, the galvano mirror 33 is driven, and thus, control of the passing position of each beam is enabled.

Note that the passing positions of beams slightly differ between surfaces of the polygon mirror 35 due to beveling of the polygon mirror 35 in many cases. In order to eliminate influences therefrom, it is desirable that beam passing information should be obtained and calculated for a number of times equal to the number of surfaces of the polygon mirror of the optical system or equal to a multiple of the number of the surfaces by an integer, and that the galvano mirrors should be controlled on the basis of the average of the beam passing information.

Figure 7:
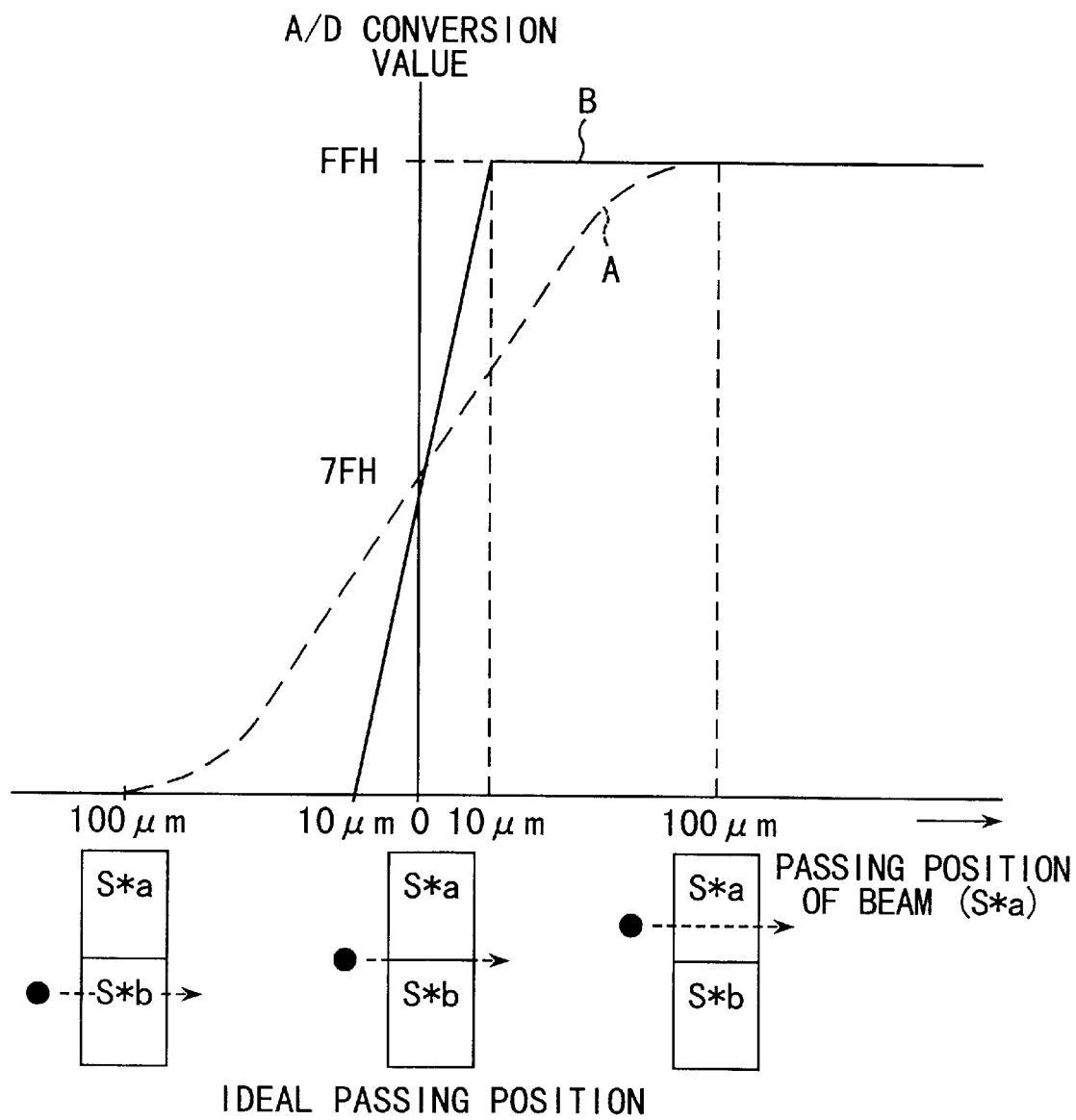
FIG. 7 is a graph showing a relationship between a passing position of a beam and an output of an A/D converter.
Figure 12:
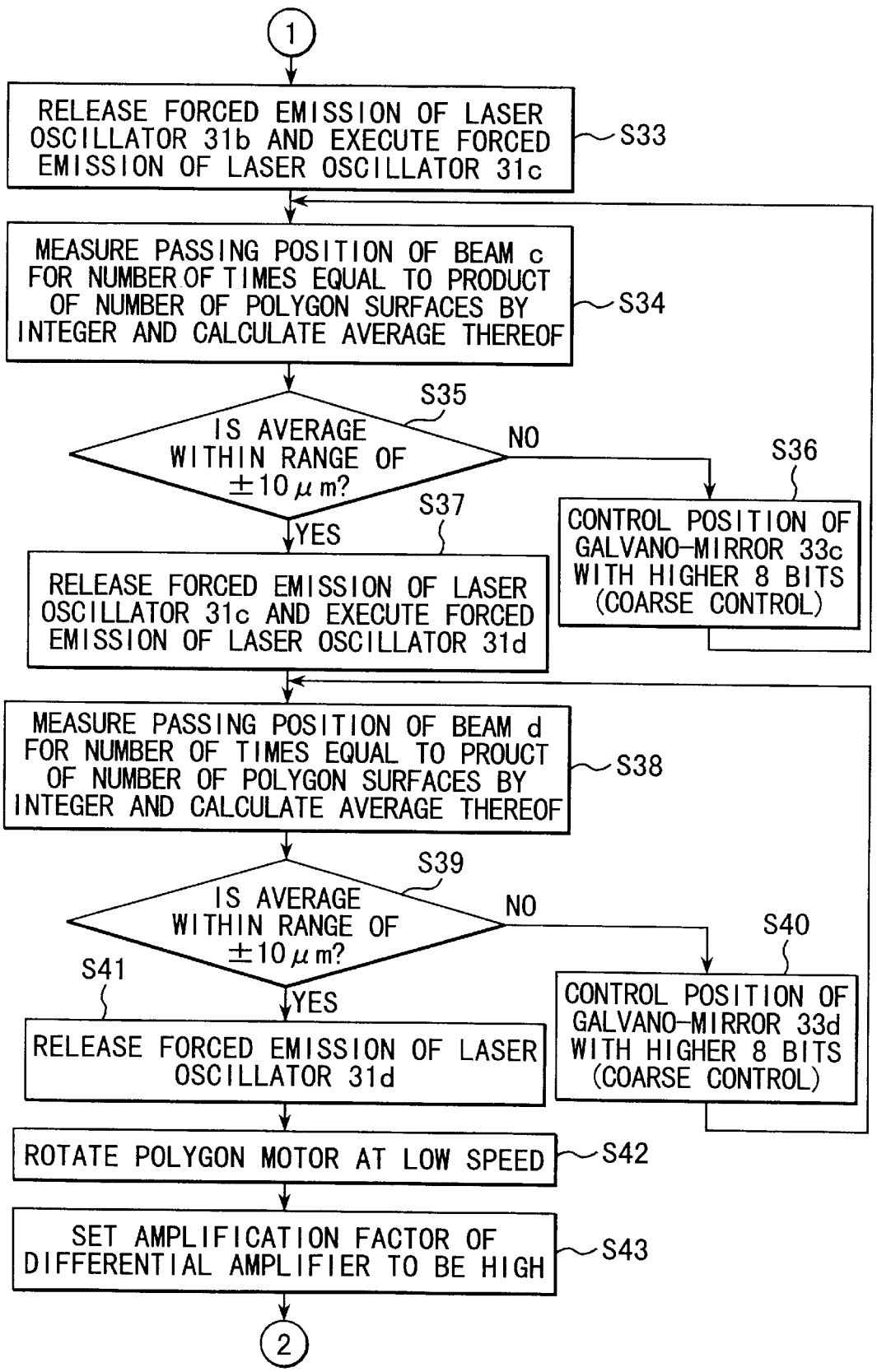
FIG. 12 is a flow-chart explaining a beam passing position control routine.
Figure 13:
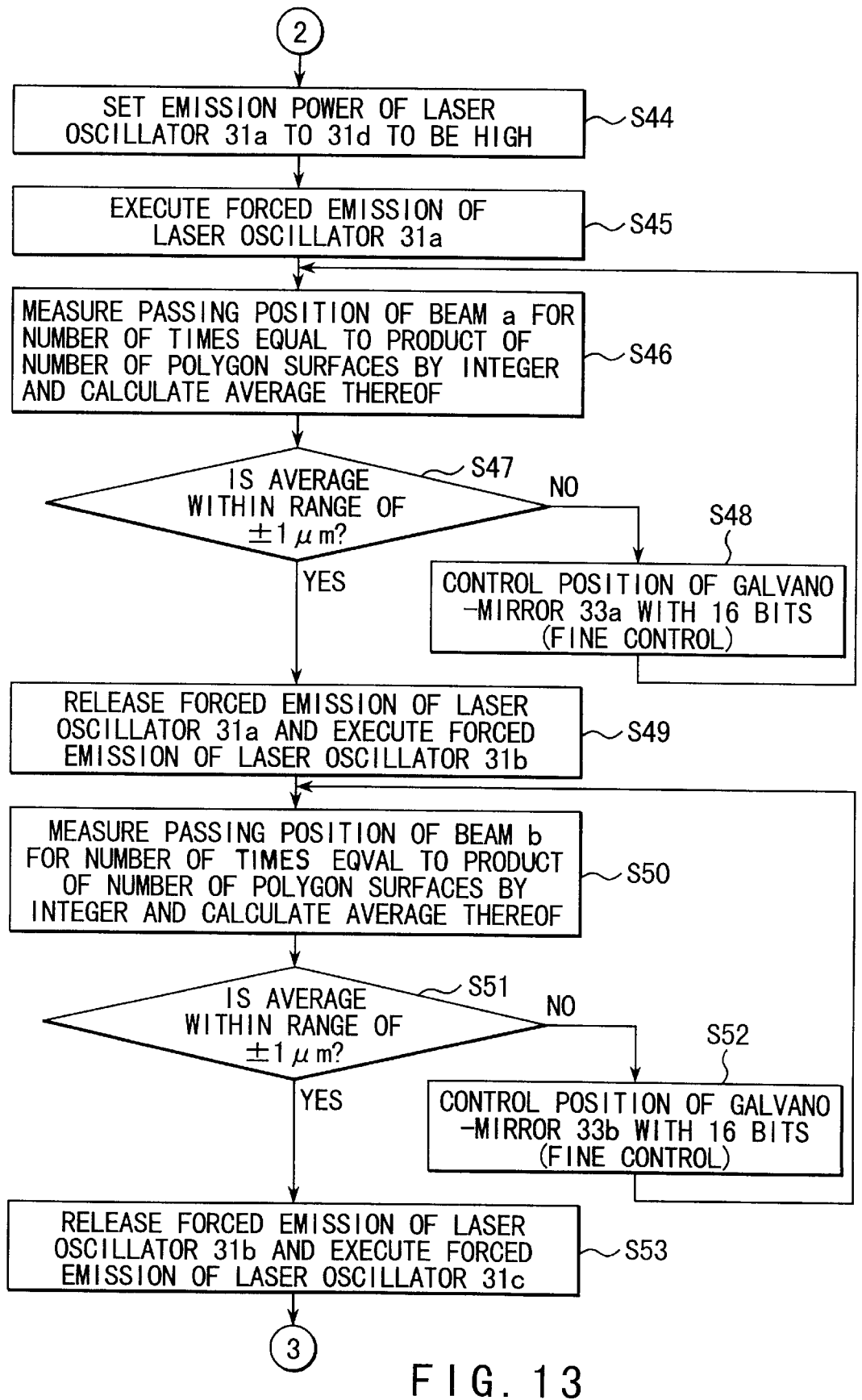
FIG. 13 is a flow-chart explaining a beam passing position control routine.
Figure 14:
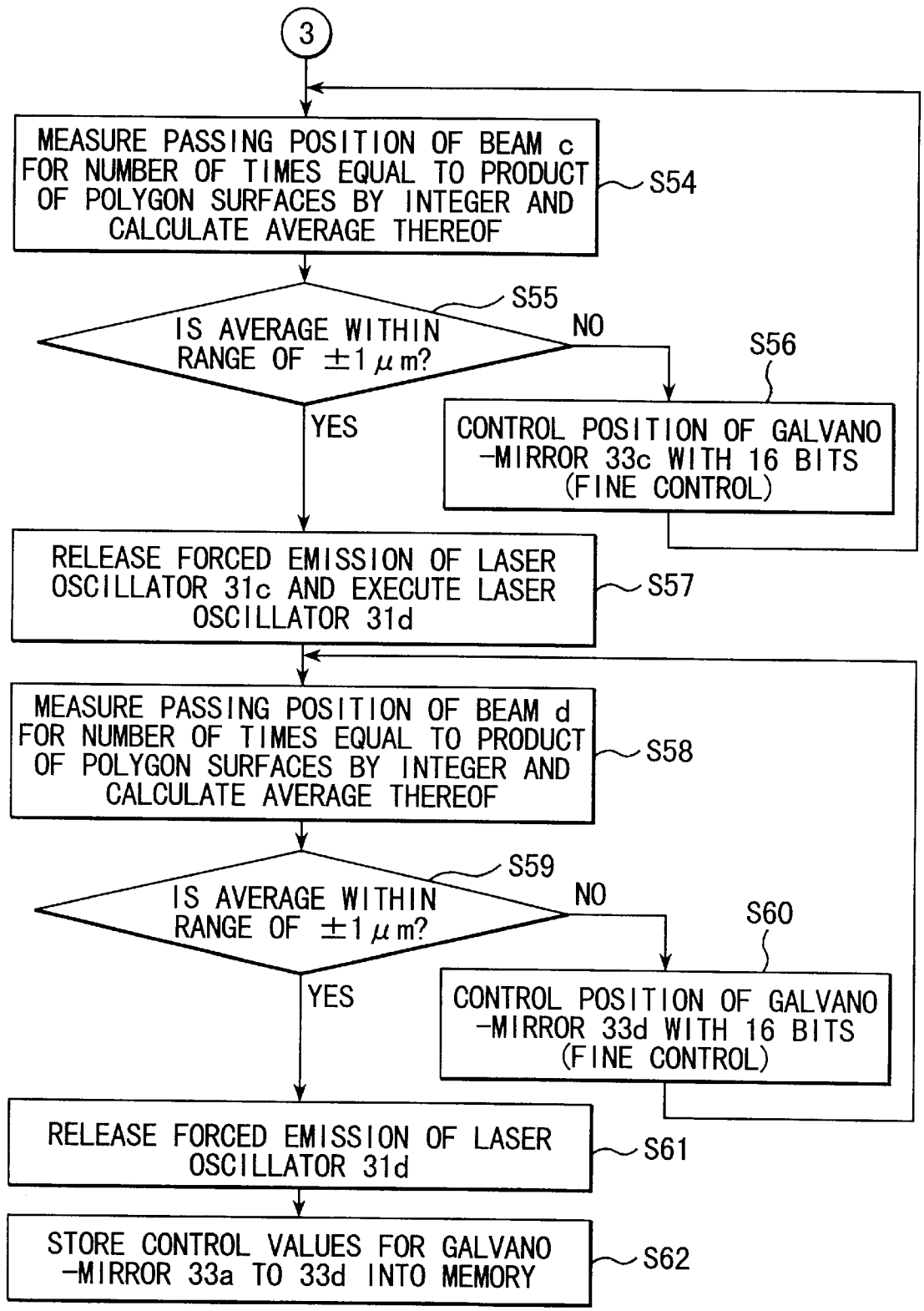
FIG. 14 is a flow-chart explaining a beam passing position control routine.

FIG. 7 is a graph showing a relationship between a passing position of a beam and an output of the A/D converter 63. The lateral axis of the graph represents the passing position of the beam and exemplarily shows the passing position of the beam with respect to light receiving patterns S*a and S*b. Specifically, the center of the lateral axis means that the passing position of a beam exists in the center between the light receiving patterns S*a and S*b as described above. The left-hand side of the lateral axis means that the passing position of a beam exists in the light receiving pattern S*b side. On the contrary, the right-hand side of the lateral axis means that the passing position of a beam exists in the light receiving pattern S*a side.

A curve A indicated by a broken line means the output value of the A/D converter 63 with respect to a passing position of a beam where the power of a beam, the rotation speed of the polygon mirror 35, and the amplification factor of the differential amplifier 61 are set to certain values. Under this condition, the passing position of a beam changes within a range of about 100 $\mu$m in each of S*a and S*b sides from an ideal position (i.e., the center of the paired light receiving patterns). The change teaches that the curve is substantially linear when the passing position is in the area near the ideal position, but the linearity of the curve becomes lower as the passing position of the beam is deviated more far away from the center.

This is because the beam has an elliptic or substantially circular cross section so that the change of the area where the beam crosses the light receiving patters decreases as the beam is deviated more far away from the center. Another factor is that the energy distribution of a beam is normally a Gaussian distribution in which the energy is largest at the center of the beam and the energy level decreases toward the periphery of the beam. Therefore, the change ratio of the energy becomes smaller as the distance from the center of the beam becomes larger.

In contrast, a curve B indicates a case where the power of a beam is raised, the rotation speed of the polygon mirror 35 is reduced, and the amplification factor of the differential amplifier 61 is raised in comparison with the condition described above. This curve B has a sharper inclination than the curve A, and is substantially linear within a range of ± from the ideal passing position. This means that the output of the beam detector 38 is increased and the output of the differential amplifier 61 greatly oscillates with respect to an equal dislocation of the beam from the ideal position, for example, when the power of the beam is raised.

When the rotation speed of the polygon mirror 35 is reduced, the time period for which the light receiving patterns are exposed with a beam is increased, so that the output of the beam detector 38 is raised, resulting in the same phenomenon as described above. Also, in case where the amplification factor of the differential amplifier 61 is raised, the output of the beam detector 38 itself does not change but the same phenomenon as described above appears as a result.

Such characteristics as described above can be adopted to detect a passing position of a beam, in the following manner. Specifically, the characteristic A indicated by a broken line in FIG. 7 is selected when performing coarse control, while the characteristic B indicated by a continuous line in FIG. 7 is selected when performing fine control.

For example, in case where the passing position of a beam is to be controlled in a state in which the passing position of the beam cannot be estimated at all, like in an initial operation where the power of the present copying machine is turned on, the passing position of a beam can be roughly controlled efficiently by setting the power of beams, the rotation speed of the polygon mirror 35, and the amplification factor of the differential amplifier 61 in compliance with the condition which provides the characteristic A of the broken line of the graph in FIG. 7.

Under this condition, the A/D conversion value changes when the passing position of a beam is within a range of ±100 μm. Therefore, the passing position of the beam can easily be set within a range of ±100 μm from the ideal position if only the main control section varies the passing position of the beam in units each consisting of 100 μm or so. If the movable range of a galvano mirror 33 is, for example, equivalent to a movement range of about 2 mm of a beam on an image surface, the passing position of the beam can fall in the aimed range by making a passing position correction for twenty times at worst.

The passing position of the beam can thus fall within the range of ±100 μm, and then, the passing position of the beam can be approximately estimated from the A/D conversion value at this time. If the galvano mirror 33 is controlled on the basis of this value, the passing position of the beam can be rapidly controlled although the control attains relatively low accuracy. Here, the word "approximately" is used since the characteristic A of the broken line in FIG. 7 is not linear but is loosely curved.

Meanwhile, the passing position of a beam can be controlled finely the characteristic B indicated by a continuous line of the graph in FIG. 7. In the example of the continuous line in FIG. 7, the passing position of the beam changes from 00H to FFH within a range of ±10 μm from the ideal position, and this change is substantially linear. Therefore, in theory, the main control section 51 is capable of detecting the passing position of a beam with an accuracy of about 0.08 μm. Consequently, the passing positions of beams can be controlled very accurately if galvano mirrors 33 are controlled with a detection accuracy raised by correcting one or all of the power of beams, the rotation speed of the polygon mirror 35, and the amplification factor of the differential amplifier 61 after the control of the position of a beam is carried out as described above.

In the next, the control characteristic of the galvano mirrors 33 will be explained.

FIGS. 8 and 9 show a relationship between data to be supplied to the galvano mirror drive circuit 39 and a beam passing position on the beam detector 38 (or the photosensitive drum 15). As shown in FIG. 5, the D/A converter 65 of the galvano mirror drive circuit 39 receives a 16-bit input.

FIG. 8 shows a state in which the passing position of a beam changes with respect to inputs of higher 8 bits of the 16-bit data. As shown in this figure, the passing position of a beam moves by 2000 μm (2 mm) with respect to data 00H to FFH. Also, as shown in this figure, the passing position of the beam exceeds the response range of the galvano mirrors 33, with respect to inputs near 00H and FFH, so that the passing position of the beam does not change.

However, when an input is within a range of 18H to E8H, the passing position of the beam changes linearly so that the change ratio is equivalent to a distance of about 10 μm per 1 LSB.

FIG. 9 shows a state in which the passing position of a beam changes with respect to inputs of lower 8 bits from the D/A converter 65 of the galvano mirror drive circuit 39. Note that this figure shows a change of the passing position of a beam with respect to lower 8 bits on condition that inputs of higher 8 bits are values within a range in which the passing position of the beam changes linearly as described above. As is apparent from the figure, the passing position of the beam changes by about 10 μm with respect to inputs of lower 8 bits from 00H to FFH, and this changes is equivalent to 0.04 μm per 1 LSB.

In this manner, the main control section 51 is capable of moving the beam passing position on the beam detector 38, i.e., on the photosensitive drum 15 within a range of about 2000 μm with a resolution of about 0.04 μm and a range of about 2000 μm (2 mm) by supplying 16-bit data to the galvano mirror drive circuit 39.

In the next, schematic operation when the power of the printer section 2 is turned on will be explained with reference to a flow-chart shown in FIG. 10. Note that operation of the scanner section 1 will be omitted herefrom.

When the power of the present copying machine is turned on, the main control section 51 makes a fixture roller in a fixing device 26 rotate, and starts heating control of the fixing device 26 (S1 and S2). In the next, the main control section 51 executes a beam passing position control routine for the sub-scanning direction, to control the passing positions of beams to predetermined positions (S3).

After the passing positions of beams are properly controlled, synchronized leading-in in the main scanning direction is carried out, and simultaneously, APC control (automatic power control) is carried out by a hardware such that each beam is emitted with a desired power. In the next, the photosensitive drum 15 is rotated and processing steps are initialized (S5), for example, by maintaining the condition of the surface or the like at a constant condition.

After a series of initialization is thus carried out, the fixture roller is kept rotated until the temperature of the fixing device 26 increases to a predetermined temperature, and thus, the section comes into a stand-by state (S6). When the temperature of the fixing device 26 reaches a predetermined temperature, the rotation of the fixture roller is stopped (S7), and the section goes into a copy command waiting state (S8).

The main control section 51 executes copying operation upon receipt of a copy (or print) command through a control panel 53 (S9). When the copying operation ends, the section goes again into a copy command waiting state (S8). In addition, the beam passing position control routine is automatically executed again (S11), for example, when has passed after the beam passing position control routine is carried out in the copy command waiting state (S10). When this routine ends, the section goes again into a copy command waiting state (S8).

Further, when copying operation of plural documents is carried out, the control of passing positions of beams according to the present invention may be carried out in so-called inter-sheet processing (which means processing to be carried out before an image of a next original is formed after an image of an original is formed in case where a plurality of originals are copied).

Specifically, after receiving a command of copying operation, passing positions of beams are detected to carry out beam passing position control (S12). Next, it is determined whether or not a passing position is dislocated by a distance greater than a predetermined value L. If it is greater than the value, beam passing position control is carried out (S14). After control of beam position, the copying operation is carried once (S15). If passing positions are dislocated by a distance smaller than the predetermined value, position control is not carried and the copying operation is executed. And continuation of the copying operation command is checked (S8), if the command is continuing, the position adjustment and the copying routine (S12 to S15) are continuously performed.

As the steps described above, when copying operation of plural sheets, the beam passing position control is carried between one copying operation and one copying operation (what is called "between papers"). Because when the beam passing position is controlled during the copying operation it is dangerous that forming image become confusing on its way.

As a result of this, it is possible to automatically carry out control of beams without waiting for any particular instructions from an operator.

In the next, a beam passing position control routine in the steps S3 and S11 in FIG. 10 will be explained with reference to the flow-charts shown in FIGS. 11 to 14.

The main control section 51 reads the latest galvano mirror drive values from the memory 52, and makes galvano mirrors 33a, 33b, 33c, and 33d be driven on the basis of the values (S21). In the next, the control section 51 makes the polygon motor 36 rotate at a high speed (S22), sets the amplification factor of the differential amplifier 61 to be low (S23), and sets the emission powers of the laser oscillators 31a, 31b, 31c, and 31d to be low (S24), so that the characteristic A (or relationships between the passing positions of beams and the A/D conversion values) is obtained thereby to approximately grasp the positions of beams. In this state, the rotation sped of the polygon motor 36 and the powers of the laser oscillators 31a to 31d are equal to the conditions where an image is formed with a resolution of 600 DPI.

By selecting the setting described above, the A/D conversion value changes within a range of ±100 µm from an aimed beam passing position as has been explained before, and hence, beam passing positions can be approximately detected.

In this state, the laser oscillator 31a is forcedly operated to emit a beam a (S25), at first, and the passing position of the beam a is measured for a number of times equal to a multiple of the number of surfaces of the polygon mirror 35 by an integer. The average of measured passing positions is taken as the passing position of the beam a (S26).

In the case of the present embodiment, since the polygon mirror 35 has eight surfaces as shown in FIG. 2, passing position information is obtained sequentially for 16 times and is averaged as the passing position of the beam a. Thus, data is obtained for a number of times equal to a multiple of the number of surfaces of the polygon mirror 35 and is then averaged, for the reason that deviation components of the surfaces and the axis which appear in cycle of one rotation of the polygon mirror 35 can be eliminated and an averaged passing position of a beam can be obtained.

On the basis of the beam passing position information thus obtained, whether or not the averaged passing position of the beam a is within an aimed range of ±10 µm is determined (S27). If the averaged passing position of the beam a is not within the aimed range of ±10 µm, the position of the galvano mirror 33a is controlled (S28) so as to fall in the range, with use of higher 8 bits of a 16-bit control signal for the galvano mirror drive circuit 39a (by coarse adjustment), and the passing position of the beam a is measured again (S26).

If the averaged passing position is determined as being within the range of ±10 µm from the aimed passing position in the step S27, forced emission of the laser oscillator 31a is released, and then, the laser oscillator 31b is forcedly operated to emit a beam.

Subsequently, like in the case of the beam a, an averaged passing position of the beam b is measured and calculated, and the galvano mirror 33b is controlled in accordance with the calculation result, so that the passing position of the beam b falls in the range of ±10 µm from an aimed passing position (S30 to S32).

Further, passing positions of beams c and d are controlled in the same manner as described above, so that each of the passing positions falls in a range of ±10 µm from an aimed passing position (S33 to S41).

In this manner, each of passing positions of four beams a, b, c, and d is controlled (coarse adjustment) so as to fall in a range of ±10 µm from its own target position.

In the next, the main control section raises the detection accuracy for passing positions of the beams, and carries out passing position control more accurately.

Specifically, the rotation speed of the polygon motor 36 is reduced to be lower than that adopted for forming an image (S42), and the amplification factor of the differential amplifier 61 is set to be high (S43). Further, the emission powers of the laser oscillators 31a, 31b, 31c, and 31d are set to be higher than those adopted for forming an image (S44). In this manner, the detection accuracy for passing positions of the beams are arranged so as to comply with the characteristic B indicated by a continuous line in FIG. 7.

Now, when beam passing position is detected, it is enough that at least one of the processes of S42, S43, S44—for raising the detection accuracy in appearance—is performed. If one of the three processes or two combination of them are performed, an effect of raising detection accuracy is gained by a certain degree.

In this state, the laser oscillator 31a is forcedly operated to emit a beam a (S45), and the passing position of the beam a is measured for a number of times equal to a multiple of the number of surfaces of the polygon mirror 35 by an integer. An averaged value of the measured passing positions is calculated and the passing position of the beam a is obtained (S45).

Here, the beam passing position is measured with a higher accuracy than in the above-described measuring (for the coarse adjustment), and therefore, it is ideal that the averaged position should be obtained on the basis of data equivalent to five or more rotations of the polygon mirror 35, i.e., data obtained by measuring the passing position for 40 or more times.

On the basis of beam passing position information thus obtained, whether or not the averaged passing position is within a range of ±1 μm from an aimed position is determined like in the above case of coarse adjustment (S47). If the averaged passing position of the beam a is not within the range of ±1 μm from the aimed position, as a result of this determination, the position of the galvano mirror 33a is controlled (fine adjustment) so as to fall in the range (S48), with use of all the 16 bits of a 16 bit control signal for the galvano mirror drive circuit 39a, and the passing position of the beam a is measured again (S46).

If the averaged passing position is determined as being within a range of ±1 μm from the aimed passing position in the step S47, the force emission of the laser oscillator 31a is released, and then, the laser oscillator 31b is forcedly operated to emit a beam b (S49).

Subsequently, like in the case of the beam a, an averaged passing position of the beam b is measured and calculated, and the galvano mirror 33b is controlled in accordance withe the calculation result, so that the passing position of the beam b falls in fall in the range of ±1 μm from an aimed passing position (S50 to S52).

Further, passing positions of beams c and d are controlled in the same manner as described above, so that each of the passing positions falls in a range of ±1 μm from an aimed passing position (S53 to S61).

In this manner, each of passing positions of four beams a, b, c, and d is controlled (fine adjustment) so as to fall in a range of ±1 μm from its own target position, and control values for the galvano mirror drive circuits 33a to 33d in this control are stored into the memory 52 (S62).

Incidentally, so the control (S12 to S14 on FIG. 10) of plural sheets is performed every one copying operation and control time is short (frequently control), a shift value of the beam passing position is not larger than 10 μm. Therefore, on the coarse adjustment (S22 to S43) the control (S12 to S14) can be omitted. The coarse adjustment omission makes possible to perform the copying operation with favorite image without reducing the speed of copying operation.

As has been explained above, according to the present invention, a digital copying machine using a multi-beam optical system has the following features. Specifically, each of passing positions of beams is detected by a beam detector provided at a position equivalent to the surface of a photosensitive drum, and on the basis of the detection results, calculation is carried out to obtain a beam path control amount with which the relative position of each beam on the surface of the photosensitive drum is controlled to a proper position. In accordance with the beam path control amount thus calculated, a galvano mirror for correcting the relative position of each beam on the surface of the photosensitive drum is controlled. Therefore, the positional relationship between beams each other can continuously be controlled to be an ideal positional relationship, without requiring any particular accuracy or adjustment, even if any change is caused in the optical system due to circumferential changes or time-based changes. Consequently, a high image quality can be continuously maintained.

In the above embodiment, description has been made to a case of adopting the present invention to a digital copying machine using a multi-beam optical system. However, the present invention is not limited to this embodiment, but is applicable to a single beam optical system and further to other image forming apparatuses than a digital copying machine.

As has been described above, according to the present invention, it is possible to provide a beam scanning device and an image forming apparatus which are capable of controlling positions of beams to predetermined position on a scanning surface to be scanned and are therefore capable of continuously maintaining a high image quality, even if circumferential changes and time-based changes are caused in their optical systems.

In addition, according to the present invention, it is possible to provide a beam scanning device and an image forming apparatus which do not require any particular accuracy or adjustment in assembling their optical systems especially when using a plurality of beams and which are capable of continuously controlling the positional relationship between respective beams on a surface to be scanned, at an ideal positional relationship, even when changes appear in their optical systems due to circumferential changes and time-based changes, so that a high image quality can be continuously maintained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A beam position controlling apparatus comprising:

means for generating a beam;

means having a plurality of reflection surfaces, for deflecting the beam emitted by the generating means onto an image carrier, so as to scan the image carrier in a first direction with the beam;

means for detecting a position of the deflected beam so as to scan the image carrier, on a surface of the image carrier, and for outputting a first signal corresponding to the position of the beam;

conversion means for subjecting the first signal from the detecting means to analogue/digital conversion so as to output a second signal;

means for calculating an adjustment amount by which the position of the beam is corrected on the surface of the image carrier, based on the second signal outputted from the conversion means; and means for adjusting the position of the beam emitted from the generating means in a second direction perpendicular to the first direction, based on a calculation result obtained by the calculating means.

2. A beam position controlling apparatus according to claim 1, further comprising means for controlling the generating means such that the beam is emitted based on supplied image data, so as to form an image on the image carrier.

3. A beam position controlling apparatus according to claim 1, wherein the conversion means includes means for integrating the first signal outputted from the detecting means so as to generate an integrated signal; and means for converting the integrated signal to the second signal.

4. A beam position controlling apparatus according to claim 1, further comprising means for storing the adjustment amount obtained by the calculating means.

5. A beam position controlling apparatus according to claim 4, wherein the adjusting means includes means for performing adjustment operation based on the adjustment amount stored in the storing means.

6. A beam position controlling apparatus according to claim 1, wherein the adjusting means includes means having a galvano mirror and a drive circuit for supplying a predetermined current to rotate the galvano mirror, such that the current is supplied to the drive circuit only during the adjustment operation.

7. A beam position controlling apparatus according to claim 1, wherein the detecting means includes a first sensor and a second sensor disposed in the second direction.

8. A beam position controlling apparatus according to claim 7, wherein the detecting means includes means for outputting a difference signal between signals outputted from the first and second sensors, as the first signal.

9. A beam position controlling apparatus according to claim 1, wherein the calculating means includes means for making the detecting means execute detection operation for a number of times equal to a multiple of a number of the reflection surfaces of the deflecting means by an integer, and for calculating the adjustment amount based on an average value of a plurality of detection results thereby obtained.

10. A beam position controlling apparatus according to claim 1, wherein the generating means includes a plurality of light sources, and wherein the detecting means is characterized in that there are provided a plurality of detecting means corresponding in number to the plurality of light sources.

11. A beam position controlling apparatus according to claim 2, further comprising means for rotating the deflecting means.

12. A beam position controlling apparatus according to claim 2, wherein the adjusting means includes means having a galvano mirror and a drive circuit for supplying a predetermined current to rotate the galvano mirror, such that the current is supplied to the drive circuit only during the adjustment operation and during image forming operation by the image forming means.

13. A beam position controlling apparatus according to claim 2, further comprising means for substantially switching a sensitivity of the detecting means between the adjustment operation by the adjusting means and the image forming operation by the image forming means.

14. A beam position controlling apparatus according to claim 13, wherein the switching means includes means for controlling the generating means such that the beam is emitted at a first intensity during the image forming operation by the image forming means and the beam is emitted at a second intensity stronger than the first intensity during the adjustment operation by the adjusting means.

15. A beam position controlling apparatus according to claim 13, wherein the switching means includes means for controlling the rotation means such that the deflecting means is rotated at a first speed during the image forming operation and the deflecting means is rotated at a second speed during the adjustment operation.

16. A beam position controlling apparatus according to claim 13, further comprising means for setting a mode in which the image forming means is made continuously perform image forming operation, and means for controlling the adjusting means so as to perform adjustment operation within a period between formation of one image and formation of another one image while the image forming means continuously performs the image forming operation.

17. A beam position controlling apparatus according to claim 2, further comprising means for controlling the adjusting means so as to perform adjustment operation every time when a predetermined time period has passed.

18. A beam position controlling apparatus according to claim 2, wherein the detection means includes a first photo-sensor and a second photo-sensor disposed in the second direction.

19. A beam position controlling apparatus according to claim 18, wherein the detecting means includes means for detecting a difference signal between signals outputted from the first and second photo-sensors, as the first signal.

20. A beam position controlling apparatus according to claim 2, further comprising:

means for setting a mode in which the image forming means is made continuously perform image forming operation; and means for controlling the calculating means such that the calculating means calculates the adjustment amount with a first accuracy and thereafter with a second accuracy higher than than first accuracy, in a first image forming operation and calculates the adjustment amount only with the second accuracy in a second or more image forming operations, while the image forming means continuously performs the image forming operation.

21. A beam position controlling apparatus comprising:

a plurality of means for respectively generating beams;

means having a plurality of reflection surfaces, for deflecting the beams emitted by the plurality of beam emission means onto an image carrier so as to scan the image carrier in a first direction with the beams;

means for rotating the deflecting means;

a plurality of first detecting means respectively provided for the beams, for detecting an inclination of each of the beams deflected by the deflecting means to scan the image carrier, on a surface of the image carrier, and for outputting an analogue signal corresponding to the position of the beam;

a plurality of second detecting means different from the first detecting means, respectively provided for the beams, for detecting an inclination of each of the beams deflected by the deflecting means so as to scan the image carrier, on the surface of the image carrier, and for outputting an analogue signal corresponding to the position of the beam;

conversion means for subjecting the analogue signals from the first and second detecting means to analogue/digital conversion so as to output a digital signal;

means for calculating an adjustment amount by which the position of each of the beam is corrected on the surface of the image carrier, based on the digital signal outputted from the conversion means; and a plurality of means respectively provided so as to correspond to the plurality of generating means, for adjusting a position of each of the beams emitted from the plurality of generating means in a second direction perpendicular to the first direction corresponding to a calculation result obtained by the calculating means.

22. A beam position controlling apparatus according to claim 21, further comprising means for controlling the plurality of generating means so as to form an image on the image carrier, such that the beams are emitted corresponding to supplied image data.

23. A beam position controlling apparatus according to claim 22, wherein the adjusting means includes means having a galvano mirror and a drive circuit for supplying a predetermined current to rotate the galvano mirror, such that the current is supplied to the drive circuit only during the adjustment operation and during image forming operation by the image forming means.

24. A beam position controlling apparatus according to claim 21, further comprising means for substantially switching a sensitivity of the detecting means between the adjustment operation by the adjusting means and the image forming operation by the image forming means.

25. A beam position controlling apparatus according to claim 21, wherein the switching means includes means for controlling the generating means such that the beams are emitted at a first intensity during the image forming operation by the image forming means and the beams are emitted at a second intensity stronger than the first intensity during the adjustment operation by the adjusting means.

26. A beam position controlling apparatus according to claim 23, wherein the switching means includes means for controlling the rotating means such that the deflecting means is rotated at a first speed during the image forming operation and the deflecting means is rotated at a second speed during the adjustment operation.

27. A beam position controlling apparatus according to claim 21, wherein the plurality of first detecting means are provided at a pitch corresponding to a first resolution, and the plurality of second detecting means are provided at a second resolution different from the first resolution.

28. A beam position controlling apparatus according to claim 21, further comprising means for inhibiting the plurality of generating means from simultaneously emitting two or more beams, to inhibit two or more of the adjusting means from simultaneously operating.

29. A beam position controlling apparatus according to claim 2, wherein the conversion means includes means for integrating the first signal outputted from the detecting means so as to generate an integrated signal; and means for converting the integrated signal to the second signal.

30. A beam position controlling apparatus according to claim 2, wherein the calculating means includes means for making the detecting means execute a multiple of a number of the reflection surfaces of the deflecting means by an interger, and for calculating the adjustment amount based on an average value of a plurality of detection results thereby obtained.

31. A beam position controlling apparatus according to claim 2, wherein the generating means includes a plurality of light sources, and wherein the detecting means is characterized in that there are provided a plurality of detecting means corresponding in number to the plurality of light sources.

* * * * *

UNITED STATES PATENT AND TRADEMARK OFFICE
CERTIFICATE OF CORRECTION

PATENT NO. : 5,892,533
DATED : April 6, 1999
INVENTOR(S) : Koji TANIMOTO et al.

It is certified that error appears in the above-identified patent and that said Letters Patent is hereby corrected as shown below:

On the title page, item

[30] Foreign Application Priority Data, was omitted, please insert --March 21, 1996 [JA] Japanese 8-064724--

Signed and Sealed this

Sixteenth Day of November, 1999

Attest:

Q. TODD DICKINSON

*Attesting Officer*      *Acting Commissioner of Patents and Trademarks*